United States Patent
Margalit et al.

(10) Patent No.: US 10,095,569 B2
(45) Date of Patent: Oct. 9, 2018

(54) SYSTEM AND METHOD FOR GENERATING A GRAPHICAL DISPLAY REGION INDICATIVE OF CONDITIONS OF A COMPUTING INFRASTRUCTURE

(71) Applicant: ServiceNow, Inc., Santa Clara, CA (US)

(72) Inventors: Adar Margalit, Modiin (IL); Yuval Rimar, Petah Tikva (IL); Amir Schnabel, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 125 days.

(21) Appl. No.: 15/178,698

(22) Filed: Jun. 10, 2016

(65) Prior Publication Data

US 2017/0123885 A1  May 4, 2017

Related U.S. Application Data

(60) Provisional application No. 62/249,611, filed on Nov. 2, 2015, provisional application No. 62/249,634, filed on Nov. 2, 2015.

(51) Int. Cl.
*G06F 11/00* (2006.01)
*G06F 11/07* (2006.01)
*G06F 11/34* (2006.01)

(52) U.S. Cl.
CPC ...... *G06F 11/0769* (2013.01); *G06F 11/0709* (2013.01); *G06F 11/079* (2013.01); *G06F 11/0751* (2013.01); *G06F 11/34* (2013.01)

(58) Field of Classification Search
CPC .... G06F 11/0709; G06F 11/079; G06F 11/34; G06F 11/0751
See application file for complete search history.

(56) References Cited

U.S. PATENT DOCUMENTS

| | | | |
|---|---|---|---|
| 6,983,321 B2 | 1/2006 | Trinon et al. | |
| 7,028,228 B1 * | 4/2006 | Lovy | G06F 11/3495 714/47.2 |
| 7,062,683 B2 | 6/2006 | Warpenburg et al. | |
| 7,296,194 B1 * | 11/2007 | Lovy | G06F 11/0709 709/224 |
| 7,756,828 B2 | 7/2010 | Baron et al. | |
| 7,774,458 B2 | 8/2010 | Trinon et al. | |
| 7,930,396 B2 | 4/2011 | Trinon et al. | |

(Continued)

OTHER PUBLICATIONS

International Search Report and Written Opinion for PCT Application No. PCT/US2016/059839 dated Mar. 9, 2017; 11 pgs.

*Primary Examiner* — Charles Ehne
(74) *Attorney, Agent, or Firm* — Fletcher Yoder PC

(57) ABSTRACT

Systems and methods for generating a graphical display region including a synchronized display of alert data and impact data indicative of conditions of a computing infrastructure are herein disclosed as comprising, in an implementation, identifying alerts, each alert having a timestamp indicative of a first time at which it was identified, performing an impact calculation to generate the impact data based on alerts valid as of a second time proximate to an impact calculation start time, and generating a graphical display region including impact data valid as of a display time and alert data indicative of the alerts valid as of the second time.

20 Claims, 13 Drawing Sheets

(56) References Cited

U.S. PATENT DOCUMENTS

| | | |
|---|---|---|
| 7,992,040 B2 | 8/2011 | Agarwal et al. |
| 8,301,755 B2 | 10/2012 | De Peuter et al. |
| 8,407,170 B2 | 3/2013 | Harrison et al. |
| 9,053,139 B2 | 6/2015 | Sasatani |
| 2004/0225927 A1* | 11/2004 | Warpenburg ....... G06F 11/0718 714/47.2 |
| 2006/0107086 A1* | 5/2006 | Walker ................ H04L 41/0677 714/4.1 |
| 2009/0240510 A1 | 9/2009 | Hopkins et al. |
| 2013/0208880 A1* | 8/2013 | Lovy ................... H04M 3/5175 379/265.03 |
| 2013/0332590 A1 | 12/2013 | Mohoban et al. |
| 2014/0122706 A1 | 5/2014 | Boermer et al. |
| 2015/0113337 A1 | 4/2015 | Otsuka et al. |
| 2017/0244627 A1* | 8/2017 | Lovy ....................... H04L 43/14 |

* cited by examiner

| NUMBER | SEVERITY | NODE | VALID TIME START TIME | VALID TIME END TIME |
|---|---|---|---|---|
| ALERT0010043 | CRITICAL | NODE_ID:13 | 20151102_164216 | 20151102_164230 |
| ALERT0010044 | MAJOR | NODE_ID:18 | 20151102_164218 | 20151102_164230 |
| ALERT0010045 | MINOR | NODE_ID:12 | 20151102_164223 | 20151102_164230 |
| ALERT0010046 | MINOR | NODE_ID:15 | 20151102_164224 | 20151102_164230 |

FIG. 11

| NODE | SEVERITY | ALERT ID | IMPACT CALC START TIME |
|---|---|---|---|
| NODE_ID:13 | MAJOR | ALERT0010043 | 20151102_164230 |
| NODE_ID:18 | CRITICAL | ALERT0010044 | 20151102_164230 |
| NODE_ID:12 | MINOR | ALERT0010045 | 20151102_164230 |
| NODE_ID:15 | CRITICAL | ALERT0010046 | 20151102_164230 |

FIG. 12

SYSTEM AND METHOD FOR GENERATING A GRAPHICAL DISPLAY REGION INDICATIVE OF CONDITIONS OF A COMPUTING INFRASTRUCTURE

CROSS REFERENCE TO RELATED APPLICATIONS

The present disclosure claims the benefit of U.S. Provisional Application No. 62/249,611, filed Nov. 2, 2015, entitled "System and Method for Processing Alerts and Synchronizing Data Indicative of a Condition of a Computing Network," and U.S. Provisional Application No. 62/249,634, filed Nov. 2, 2015, entitled "System and Method for Synchronizing Data Indicative of a Condition of a Computing Network," the disclosures of which are herein incorporated by reference.

TECHNICAL FIELD

The present disclosure relates to systems and methods for generating a graphical display region indicative of conditions of a computing infrastructure. More generally, the present disclosure relates to a data processing system for error or fault handling, namely, by generating a graphical display region (e.g., as part of a software graphical user interface) including data used for and generated in response to performing impact calculation on resources of a computing infrastructure. Implementations of the present disclosure can be used to enhance the ability of a server programmed for organizing and manipulating data, namely, by identifying impairments affecting the function of hardware and software resources associated with a service of a computing infrastructure.

BACKGROUND

Computing networks can be used for exchanging and storing data. Proper maintenance of infrastructures of computing networks can enable the infrastructures and networks to operate at full capacity and with limited interruption. Various computing tools exist for enabling system administrators to initiate, carry out, and monitor a variety of maintenance functions. Beyond standard maintenance, it is also important to monitor the health and status of the hardware and software resources of services provided by a computing infrastructure. Monitoring tools help ensure that repairs and updates are conducted and executed promptly by drawing the attention of system administrators and remediation programs. Monitoring tools also perform other useful functions, such as helping system administrators to reallocate resources, notify users, and make system configuration decisions.

SUMMARY

Disclosed herein are implementations of systems and methods for generating a graphical display region indicative of conditions of a computing infrastructure. In an implementation, a system is provided for generating a graphical display region including synchronized alert data and impact data indicative of conditions of nodes of a computing infrastructure. The system comprises a server comprising a processor and a memory, wherein the memory includes code executable by the processor to execute a configuration management database comprising nodes representative of at least one of an infrastructure resource or an applicative resource in the computing infrastructure, a data structure configured to store states of validity for nodes of the configuration management database, and a system management module configured to generate the graphical display region by executing instructions to identify alerts, each alert having a timestamp indicative of a first time at which it was identified, perform an impact calculation to generate the impact data based on alerts valid as of a second time proximate to an impact calculation start time, and generate the graphical display region including impact data valid as of a display time and alert data indicative of the alerts valid as of the second time.

In an implementation, a method is provided for generating a graphical display region including synchronized alert data and impact data indicative of conditions of nodes of a computing infrastructure comprising a server comprising a processor and a memory, wherein the memory includes code executable by the processor to execute a configuration management database comprising nodes representative of at least one of an infrastructure resource or an applicative resource in the computing infrastructure and a data structure configured to store states of validity for nodes of the configuration management database. The method comprises identifying alerts, each alert having a timestamp indicative of a first time at which it was identified, performing an impact calculation to generate the impact data based on alerts valid as of a second time proximate to an impact calculation start time, and generating the graphical display region including impact data valid as of a display time and alert data indicative of the alerts valid as of the second time.

In an implementation, a system comprises a memory and a processor configured to execute instructions stored in the memory to identify alerts, each alert having a timestamp indicative of a first time at which it was identified, perform an impact calculation to generate the impact data based on alerts valid as of a second time proximate to an impact calculation start time, and generate a graphical display region including impact data valid as of a display time and alert data indicative of the alerts valid as of the second time.

Details of these implementations, modifications of these implementations, and additional implementations are described below.

BRIEF DESCRIPTION OF THE DRAWINGS

The description herein makes reference to the accompanying drawings, where like reference numerals refer to like parts throughout the several views.

FIG. 11 is an illustration of an implementation of an alert table for storing alert data indicative of valid alerts for use in performing impact calculation.

FIG. 12 is an illustration of an implementation of an impact table for storing impact values generated in response to performing impact calculation using valid alerts.

DETAILED DESCRIPTION

Figure 1:
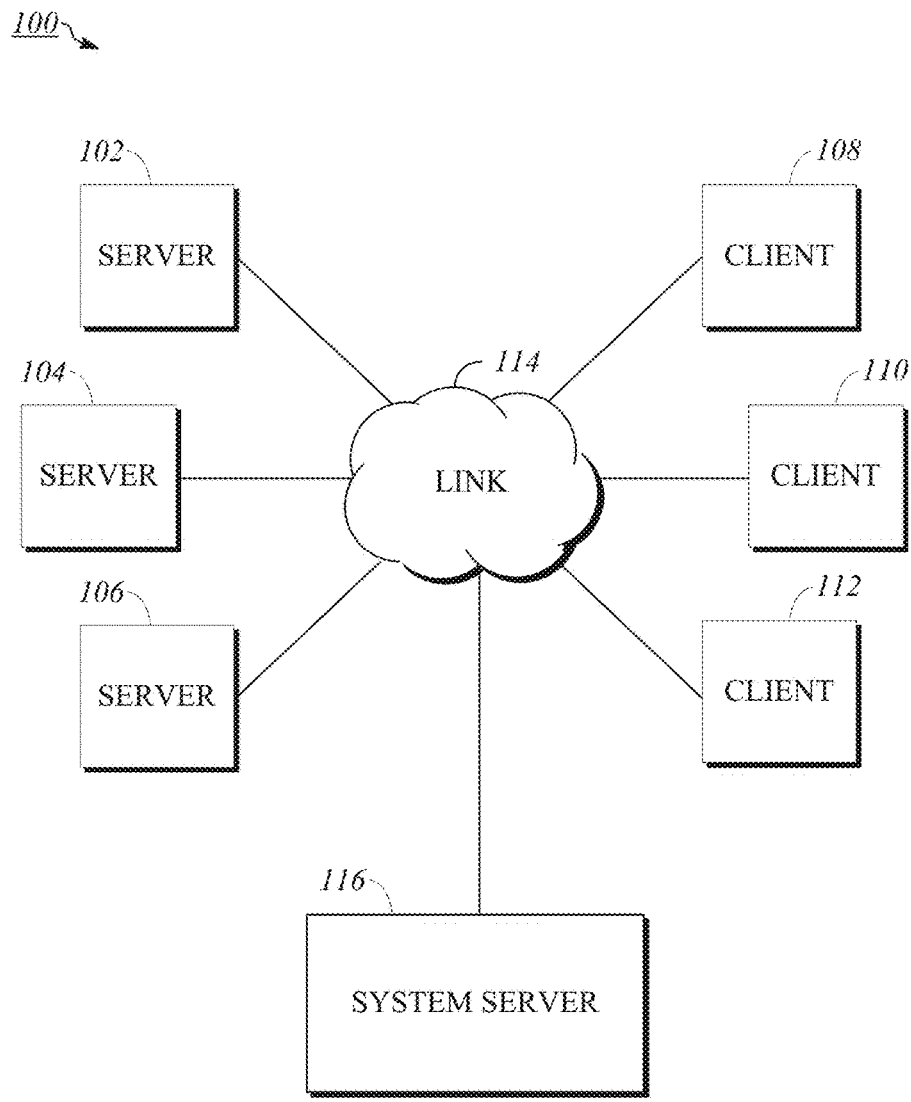
FIG. 1 is a block diagram of an implementation of a computing network.

The health and status of services deliverable by a computing infrastructure can be monitored based on the hardware and software resources involved in delivering those services. Such resources may be represented by configuration items, or nodes, within a configuration management database (CMDB). It is desirable that an operator of an infrastructure of a computing network, such as a system administrator, be able to readily identify impairments (whether potential, actual, or otherwise) affecting the function of resources. In an implementation, monitoring the health and status of a computing infrastructure can include determining the degree to which an identified impairment, or alert, affects a resource and the extent to which other aspects of the computing infrastructure are affected as a result, a process referred to as impact calculation. Data generated in response to performing impact calculation can be displayed alongside data indicative of the corresponding alerts, for example, to show the effect of the alerts on applicable resources.

Impact calculation can be performed across an entire CMDB to identify each individual resource affected by an identified alert. However, this is often unnecessarily over-encompassing, as it includes evaluating resources unrelated to the alert (e.g., by requiring that all nodes in the CMDB be tracked and evaluated each time impact calculation is performed). It may also fail to recognize situations where the impact calculation depends on the context in which a given resource is used, for example, where one function of a database server is severely impacted and another function of it is only minimally impacted. A solution to these problems includes grouping the nodes of a CMDB into configurations of deployed services, or service models, representing service environments of a customer infrastructure. This way, impact calculation can be performed on specific service models without spending time or processing power to track or evaluate nodes of the CMDB unrelated to a given identified alert. However, this solution is sub-optimal for at least a few reasons. First, it does not perform impact calculation for resources associated with, but not included within, a specific service model, and so it focuses only on resources included within specific service models. Second, it does not allow a user to reconfigure the nature of the connections, or relationships, between resources included in the service models. Impact calculation cannot provide an accurate understanding of functional impairment for a service model where some of the related resources are not mapped or up-to-date.

It can also be useful to display alerts alongside impact calculation data, for example, to show how applicable nodes of the CMDB were affected by the alerts. One solution for displaying impact calculation data for nodes of the CMDB and associated alerts is to query the data available at a given time and display that data. However, a disadvantage of such an implementation is that that data graphically representing the alerts and impact values are inconsistently displayed. An ongoing flow of alerts is constantly being identified with respect to resources of a customer infrastructure; however, because impact calculation is a time-consuming operation, the values resulting from performing an impact calculation may not accurately reflect the up-to-date values for alerts. As a result, graphical representations within the user interface may be inconsistent where the severity calculated for a given node does not match the severity of a corresponding, updated alert. For example, an alert for a database node may be identified with a medium severity. A resulting impact calculation may determine that three related application server nodes have a high severity and that the service model has an overall critical severity. Meanwhile, the underlying issue indicated by the alert may be remediated to result in a new alert indicative of a cleared severity. Thus, a graphical representation of the service model indicates that the database node has a medium severity, the three application server nodes have high severities, and the service model has an overall critical severity, while a graphical representation of the identified alerts indicates that the severities for each of these resources has been cleared. A further example may depict a service model as having a cleared severity while newly received alerts indicate a high or critical severity, for example, because impact calculation based on those alerts has not yet been performed.

Implementations of the present disclosure include systems and methods for generating a graphical display region including synchronized alert data and impact data indicative of conditions of nodes of a computing infrastructure. This may be done, for example, by maintaining data indicative of states of validity for identified alerts and severities, or impact values, calculated for nodes associated with a service model. A data structure for maintaining this data may store alert data within an alert table and impact data within an impact table. The data in the tables may be queried based on a timestamp indicative of start time of a most recently performed impact calculation as a reference value. The queried data can be used to generate a graphical display region including historical data indicative of the alert data used to perform in the impact calculation and the impact data generated in response to performing the impact calculation.

In an implementation, the alert data and impact data can be queried based on validity, or valid times for the data. For example, alert data can be considered valid during a period of time starting when the underlying alerts are identified and ending when an impact calculation operation performed using the alerts begins. Similarly, for example, impact data can be considered valid during a period of time starting upon the generation of the impact data and ending upon the performance of a following impact calculation operation. As such, in an implementation, the queried data comprises valid alert data indicative of alerts that were valid as of a start time of an impact calculation operation and valid impact data indicative of impact data generated in response to performing the impact calculation operation. By querying the alert data and impact data based on validity, graphical representations of the alerts and impact values can be consistently displayed.

The graphical display region can include alert data and impact data stored in the data structure and associated with an impact calculation performed for nodes associated with a service model. New impact calculations may be performed and the graphical display region may be updated, for example, irregularly or at regular time intervals. For example, data indicative of alerts identified or impact values calculated after a given interval ends can be stored in historical tables (e.g., of the data structure) until the following interval is reached, at which time the data can be included within the graphical display region. As such, data being processed at a current time can be stored in the tables for later display. In an implementation, the data structure can cull data that is no longer valid, for example, by determining that the stored data corresponds to alert data used for or impact data generated by past impact calculation operations.

The graphical display region can comprise part of a software graphical user interface constituting data that reflect information ultimately destined for display on a hardware device. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

In an implementation, resources refer to infrastructure resources (e.g., hardware components, such as switches, routers, servers, modems, processors, I/O interfaces, memory or storage, power supplies, biometric readers, media readers, etc.) and/or applicative resources (e.g., software components, such as platform applications, modules, routines, firmware processes, and other instructions executable by or in connection with infrastructure resources). Resources may also refer to computing features such as documents, models, plans, sockets, virtual machines, etc. In an implementation, resources can refer to physical and/or virtual implementations of the foregoing, as applicable. The present disclosure may occasionally make specific reference, for example, to "infrastructure resources" or "applicative resources" for certain uses of resources; however, where the disclosure merely references "resources," it may refer to any of the foregoing types of resources, unless the context specifically indicates otherwise. Further, the terms "resources" and "nodes" may be interchangeably used throughout this disclosure, for example, such that references to computing network resources may also refer to the CMDB node representing those resources and references to CMDB nodes may also refer to the computing network resources they represent. The terms "impact," "impact value," and "severity" and related terms may be used interchangeably throughout this disclosure to refer to a result of performing impact calculation and/or a previously identified or alternative severity for nodes.

The systems and methods of the present disclosure address problems particular to computing networks, for example, those concerning the health and status of resources associated with service models of a computing infrastructure wherein resources and service models are subject to change. These computing network-specific issues can be solved by implementations of the present disclosure. In an implementation, proper monitoring of a computing infrastructure can be facilitated by querying data structures storing historical alert data used for calculating impact of resources for display with the results of those impact calculations. The development of new ways to monitor network resources to, for example, identify system impairment and indicate areas requiring maintenance is fundamentally related to computing networks. Implementations of the present disclosure can provide a way to efficiently identify areas of possible impairment by generating a graphical display region including data indicative of impact calculated for nodes of service models and data indicative of the alerts used for the impact calculations.

To describe some implementations in greater detail, reference is first made to examples of hardware structures and interconnections usable in implementations of the present disclosure. FIG. 1 is a block diagram of an implementation of a computing network. Computing network 100 includes various computer resources including servers 102, 104, 106 and client computers 108, 110, 112 (also referred to as clients) interconnected to computing network 100 and each other via telecommunications link 114. One example of link 114 is the public Internet, and other examples include multiple local area networks, wide area networks, Intranets, Extranets, Internetworks, Wi-Fi networks, or any other suitable technology using wires, radiofrequency, microwave, satellite, cellular, optical, or other telecommunications systems. Computing network 100 includes digital data storage, which may be represented by one or more of servers 102, 104, 106. Examples of the hardware components and interconnections of servers 102, 104, 106, clients 108, 110, 112, and various data storage are discussed in detail below. In an implementation, servers 102, 104, 106 store and manage client data. Client data may be stored in a single site, location, or device. Alternatively, client data may be distributed among different sites, locations, or devices. Without any intended limitation, a single-client arrangement is used as an example throughout this disclosure.

Computing network 100 also includes system server 116, which can be programmed to relay selected information for display by clients 108, 110, 112. Another function of system server 116 can be to assemble, collect, convert, format, and otherwise prepare output for display to the various networked clients via link 114. In an implementation, system server 116 can be separate from servers 102, 104, 106. In an implementation, system server 116 can be or can be included as part of one or more of servers 102, 104, 106.

In an implementation, computing network 100 may be applied to the task of cloud computing. Cloud computing may provide various advantages over traditional computing models, including the ability to allocate shared resources amongst many different customers. Under traditional computing models, computing resources are typically allocated to a single customer or entity and substantial portions of those resources may remain unused or underused.

Computing resources of the cloud computing infrastructure may be allocated, for example, using a multi-tenant or single-tenant architecture. Under a multi-tenant architecture, installations or instantiations of application, database, and/or other software application servers may be shared amongst multiple customers. For example, a web server (e.g., a unitary Apache installation), application server (e.g., unitary Java Virtual Machine) and/or a single database server catalog (e.g., a unitary MySQL catalog) may handle requests from multiple customers. In an implementation of this architecture, the application and/or database server software can distinguish between and segregate data and other information of the various customers using the system.

In a single-tenant infrastructure, separate web servers, application servers, and/or database servers can be provisioned for each customer instance. In an implementation, each customer will access its dedicated web server(s), will have its transactions processed using its dedicated application server(s), and will have its data stored in its dedicated database server(s) and or catalog(s). Physical hardware servers may be shared such that multiple installations or instantiations of web, application, and/or database servers may be installed on the same physical server. Each installation may be allocated a certain portion of the physical server resources, such as RAM, storage, and CPU cycles.

In an implementation, a customer instance comprises multiple web server instances, multiple application server instances, and multiple database server instances. The server instances may be located on different physical servers and share resources of the different physical servers with a number of other server instances associated with other customer instances. In a given cloud computing system, different implementations of customer instances may be used for different customer instances at the same time. Other configurations and implementations of customer instances may also be used. For example, in an implementation, web server and application server functionality are treated as a single unit (of which there may be multiple units present), each unit being installed on respective physical servers.

In an implementation, web, application, or database servers may be allocated to different datacenters to facilitate high availability of the applications and data provided by the servers. For example, there may be a primary pair of web servers and application servers in a first datacenter and a backup pair of web servers and application servers in a second datacenter. Alternatively, there may be a primary database server in the first datacenter and a second database server in the second datacenter wherein the primary database server replicates data to the secondary database server. The cloud computing infrastructure may be configured to direct traffic to the primary pair of web servers which may be configured to utilize the primary pair of application servers and primary database server respectively. In a failure scenario, the secondary servers may be converted to primary servers.

Figure 2:
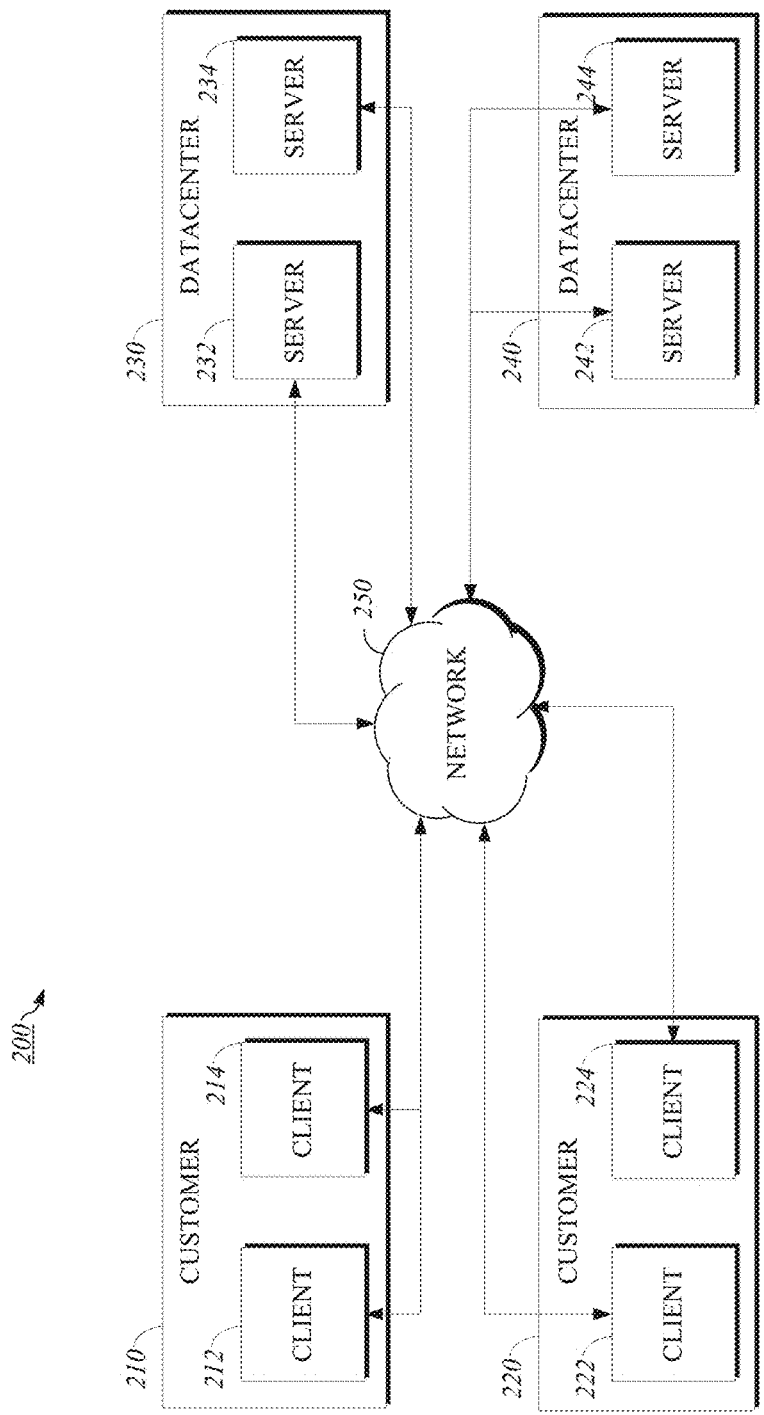
FIG. 2 is a block diagram of an implementation of a cloud computing system usable with implementations of the computing network.

FIG. 2 is a block diagram of an implementation of a cloud computing system usable within implementations of computing network 100. Cloud computing system 200 includes two customers 210, 220, although a greater number of customers may be contemplated. The customer may have clients, such as clients 212, 214 for customer 210 and clients 222, 224 for customer 220. Clients 212, 214, 222, 224 may be in the form of a computing system including multiple computing devices, or in the form of a single computing device, for example, a mobile phone, a tablet computer, a laptop computer, a notebook computer, a desktop computer, a server computer, and the like. The customers and clients are shown as examples, and a cloud computing system such as cloud computing system 200 may have a different number of customers or clients or may have a different configuration of customers or clients. For example, there may be hundreds or thousands of customers and each customer may have any number of clients. Clients 212, 214, 222, 224 may be, for example, clients 108, 110, 112 or other client computers included within computing network 100.

Cloud computing system 200 includes datacenters 230, 240. The datacenters include servers, such as servers 232, 234 for datacenter 230 and servers 242, 244 for datacenter 140. Each datacenter may represent a different location where servers are located, such as a datacenter facility in San Jose, Calif. or Amsterdam, the Netherlands. Servers 232, 234, 242, 244 may be in the form of a computing system including multiple computing devices, or in the form of a single computing device, for example, a desktop computer, a server computer, mainframe computer, computer workstation, and the like. The datacenters and servers are shown as examples, and the cloud computing system 200 may have a different number of datacenters and servers or may have a different configuration of datacenters and servers. For example, there may be tens of data centers and each data center may have hundreds or any number of servers. Servers 232, 234, 242, 244 may be, for example, servers 102, 104, 106 or other servers operative within computing network 100.

Clients 212, 214, 222, 224 and servers 232, 234, 242, 244 are connected to network 250. The clients for a particular customer may connect to network 250 via a common connection point or different connection points. Network 250 may, for example, be or include the public Internet. Network 250 may also be or include a local area network, wide area network, virtual private network, or any other means of transferring data between any of clients 212, 214, 222, 224 and servers 232, 234, 242, 244. Network 250, datacenters 230, 240, and/or blocks not shown may include network hardware such as routers, switches, load balancers, and/or other network devices. For example, each of datacenters 230, 240 may have one or more load balancers (not shown) for routing traffic from network 250 to one or more servers such as servers 232, 234, 242, 244. Network 250 may be, for example, link 114 or other telecommunications systems usable by computing network 100.

Other implementations of cloud computing system 200 are also possible. For example, devices other than the clients and servers shown may be included in the system. In an implementation, one or more additional servers may operate as a cloud infrastructure control, from which servers and/or clients of the cloud infrastructure are monitored, controlled, and/or configured. For example, some or all of the techniques described herein may operate on said cloud infrastructure control servers. Alternatively, or in addition, some or all of the techniques described herein may operate on servers such as servers 232, 234, 242, 244.

The data processing components of this disclosure, including computing network 100 of FIG. 1 and cloud computing system 200 of FIG. 2, may be implemented by various hardware devices. The makeup of these subcomponents is described in greater detail below, with reference to FIGS. 3 and 4.

Figure 3:
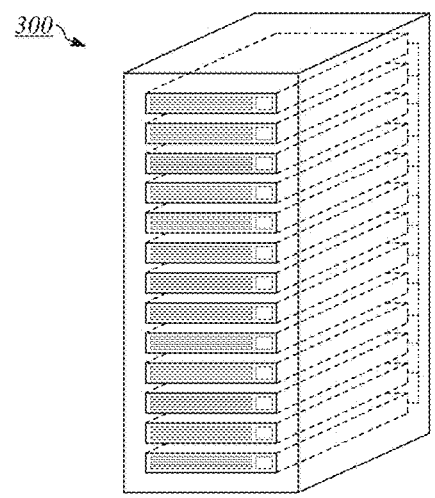
FIG. 3 is a perspective view of an implementation of a storage enclosure for housing computing equipment usable within implementations of the computing network.

FIG. 3 is a perspective view of an implementation of a storage enclosure for housing computing equipment usable within implementations of computing network 100. FIG. 3 shows a storage enclosure 300 housing computer servers, such as one or more of servers 102, 104, 106 (and/or 232, 234, 242, 244, to the extent different). One implementation of this structure includes a computer hardware rack or other storage enclosure, frame, or mounting that houses rack mounted servers. In this example, the computer servers include their own power supplies and network connections. Another implementation includes a blade enclosure containing blade servers. The blade enclosure includes power supplies, cooling units, and networking components shared by the constituent blade servers. A control center (not shown) may be included to supervise or manage operations of the racked computer servers.

Figure 4:
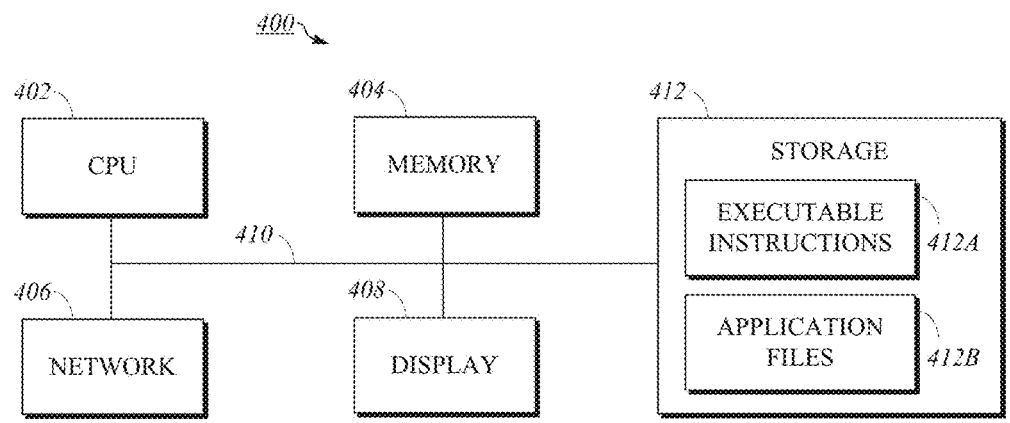
FIG. 4 is a block diagram of an implementation of a digital data processing machine usable within implementations of the computing network.

FIG. 4 is a block diagram of an implementation of a digital data processing machine 400 usable within implementations of computing network 100. Machine 400 may be implemented by one or more computing devices such as a mobile telephone, a tablet computer, laptop computer, notebook computer, desktop computer, server computer, mainframe computer, computer workstation, and the like.

In an implementation, machine 400 includes CPU 402, memory 404, storage 412, network 406, display 408, and bus 410. One example of CPU 402 is a conventional central processing unit. CPU 402 may include single or multiple processors each having single or multiple processing cores. Alternatively, CPU 402 may include another type of device, or multiple devices, capable of manipulating or processing information now-existing or hereafter developed.

Memory 404 may comprise RAM or any other suitable type of storage device. The memory 404 may include executable instructions and data for immediate access by CPU 402. Memory 404 may include one or more DRAM modules such as DDR SDRAM. Alternatively, memory 404 may include another type of device, or multiple devices, capable of storing data for processing by CPU 402 now-existing or hereafter developed. CPU 402 may access and manipulate data in memory 404 via bus 410.

Storage 412 may include executable instructions 412A and application files 412B along with other data. Executable instructions 412A may include, for example, an operating system and one or more application programs for loading in whole or part into memory 304 and to be executed by CPU 402. The operating system may be, for example, Windows, Mac OS X, Linux, or another operating system suitable to the details of this disclosure. The application programs may include, for example, a web browser, web server, database server, and other such programs. Some examples of application files 412B include client/user files, database catalogs, and configuration information. Storage 412 may comprise one or multiple devices and may utilize one or more types of storage, such as solid state or magnetic.

The internal configuration may also include one or more input/output devices, such as network 406 and display 408. Network 406 and display 408 may be coupled to CPU 402 via bus 410, in one example. Network 406 may, for example, include a network interface and may take the form of a wired network interface such as Ethernet or a wireless network interface. Other output devices that permit a client/user to program or otherwise use the client or server may be included in addition to or as an alternative to display 408. When the output device is or includes a display, the display may be implemented in various ways, including by a LCD, CRT, LED, OLED, etc. For example, display 408 of a customer or client hardware device (e.g., part of one of customers 210, 220 or clients 212, 214, 222, 224), can be a display for displaying a software graphical user interface constituting a graphical display region generated, for example, by one of servers 232, 234, 242, 244.

Other implementations of the internal architecture of clients and servers are also possible. For example, servers may omit display 408 as well as client programs such as web browsers. Operations of CPU 402 may be distributed across multiple machines which may be coupled directly or across a local area or other network. Memory 404 and/or storage 412 may be distributed across multiple machines such as network-based memory or memory in multiple machines performing the operations of clients or servers. Although depicted here as a single bus, bus 410 may be composed of multiple buses.

Various instances of digital data storage may be used to provide storage internal and/or external to the components previously described and illustrated. Depending upon its application, such digital data storage may be used for various functions, such as storing data and/or storing machine-readable instructions. These instructions may themselves support various processing functions, or they may serve to install a software program upon a computer, where such software program is thereafter executable to perform other processing functions related to this disclosure.

In any case, the storage media may be implemented by nearly any mechanism to digitally store machine-readable signals. One example is optical storage such as CD-ROM, WORM, DVD, digital optical tape, disk storage, or other optical storage. Another example is direct access storage, such as a conventional "hard drive", redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

In an implementation, a storage medium can be coupled to a processor so the processor may read information from, and write information to, the storage medium. In the alternative, the storage medium may be integral to the processor. In another example, the processor and the storage medium may reside in an ASIC or other integrated circuit.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like.

More particularly, one or more clients or servers or other machines described herein may include an ASIC or programmable logic array such as a FPGA configured as a special-purpose processor to perform one or more of the operations or steps described or claimed herein. An exemplary FPGA may include a collection of logic blocks and RAM blocks that may be individually configured and/or configurably interconnected in order to cause the FPGA to perform certain functions. Certain FPGAs may contain other general or special purpose blocks as well. An exemplary FPGA may be programmed based on a hardware definition language (HDL) design, such as VHSIC Hardware Description Language or Verilog.

Figure 5:
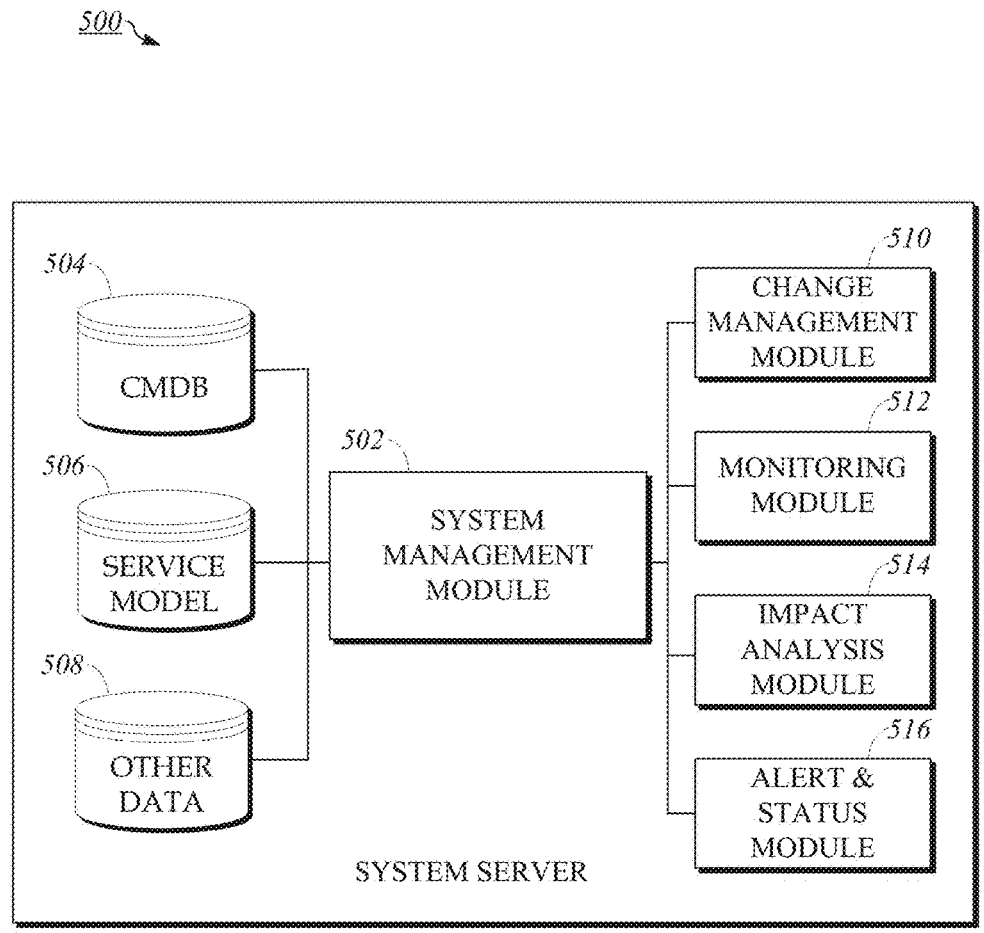
FIG. 5 is a block diagram of an implementation of a system server usable within implementations of the computing network.

Certain operational aspects of the disclosure will now be described with reference to FIGS. 5 through 13. FIG. 5 is a block diagram of an implementation of a system server 500, such as system server 116, usable within implementations of computing network 100. System server 500 may be a machine, such as machine 400, or server instance operable on a machine 400. In an implementation, system server 500 can be or can be included as part of one or more servers in one or more datacenters, such as one of servers 232, 234 of datacenter 230. In an implementation, system server 500 also or instead can be or can be included within a separate server not used for facilitating client requests.

System server 500 can include system management module 502, which monitors and processes alerts indicative of conditions of a customer infrastructure (e.g., customers 210, 220) of computing network 100. In an implementation, system management module 502 comprises instructions for performing or otherwise performs impact calculation, including, without limitation, identifying alerts applicable to a customer infrastructure, identifying resources of the customer infrastructure affected by the identified alerts, and determining the effects of the identified alerts on the identified resources. As described above, impact calculation can be performed to identify the magnitude of an effect, or severity, of identified alerts on applicable nodes of the customer infrastructure. As an alert is identified, various factors are considered to calculate severity, for example, impact rules, the number of related active alerts, a past history of affected nodes, relationships between nodes of the service model, and the resource represented by the node. The severity can then be indicated with respect to a node hierarchy, discussed below with respect to FIG. 9, and/or an impact tree, discussed below with respect to FIG. 10.

In an implementation, system server 500 comprises data used for performing impact calculation. For example, system server 500 may include one or more of CMDB 504, service model 506, and other data 508. CMDB 504 is a configuration management database comprising data representative of the nodes of a customer infrastructure (e.g., customers 210, 220) of computing network 100 and the relationships between the nodes. Service model 506 is a collection of nodes associated with a particular customer service environment (e.g., a configuration of deployed services of computing network 100). In an implementation, service model 506 can be populated, for example, by a discovery tool as discussed below with respect to FIG. 6. In an implementation, service model 506 stores information indicative of the nodes associated with the corresponding service environment for later use, for example, in performing future impact calculation. Other data 508 may be used for storing any other data associated with computing network 100, including without limitation other data as may be useful for performing impact calculation. In an implementation, other data 508 may be represented by CMDB 504 and service model 506. In an implementation, CMDB 504, service model 506, and other data 508 are comprised within a single storage component.

In an implementation, system server 500 can include various modules operable with system management module 502 for facilitating impact calculation. For example, in an implementation, system server 500 also includes change management module 510, which can be operable with system management module 502 to provide a graphical user interface (GUI) representing client-requested changes to the default nodes and relationships of CMDB 504 and/or service model 506, as applicable. Change management module 510 can also be configured to receive client-submitted notifications of planned maintenance operations affecting computing network 100. Change management module 510 may store records of planned maintenance operations in storage, for example, other data 508. In an implementation, this data may be stored as part of CMDB 504 and/or service model 506, as applicable.

In an implementation, system server 500 also includes one or more of monitoring module 512, impact analysis module 514, and alert & status module 516, operable with system management module 502. Monitoring module 512 monitors computing network 100 to identify functionally impaired resources. Impact analysis module 514 analyzes the relationship, if any, between functional impairments and planned maintenance operations. Responsive to receiving advance notification of newly planned maintenance, impact analysis module 514 may provide further services of consulting historical records from storage and formulating predictions as to future functional impairment likely to occur as a consequence of the newly planned maintenance. Alert & status module 516 outputs various notifications corresponding to functionally impaired nodes of CMDB 504. Modules 510, 512, 514, 516 may store records of functional impairment and causal relationships as well as records of any other relevant data that is found, prepared, computed, or received by modules 510, 512, 514, 516. For example, other data 508 may be used to store such data.

In an implementation, alert & status module 516 comprises instructions for tracking alert and impact data using a data structure, which may, for example, be included within other data 508. In an implementation, the data structure can include tables for storing data indicative of alerts identified by the system or other information related to processing various resources of a node hierarchy, such as impact data. In an implementation, the data structure can be a temporal data structure comprising a temporal database for maintaining temporal data related to processes performed on the node hierarchy, such as impact calculations performed based on a set of identified alerts, and for keeping track of valid time data for alerts. Data stored in the data structure can be queried in order to generate a graphical display region (e.g., as part of a software graphical user interface) including synchronized alert data and impact data accurately representative of a state of the node hierarchy and processed alert data.

In addition to modules 510, 512, 514, 516, system server 500 may include, and system management module 502 may be operable with, various other tools, modules, systems, or other functionality (not shown) for use in supporting a customer infrastructure, such as the discovery tool discussed below with respect to FIG. 6. For example, in an implementation, system server 500 includes client interface tools (not shown) operable to provide graphical views of complex information technology (IT) infrastructure and service relationships to client computers on computing network 100. These client interface tools provide output by which IT professionals can click through data maps, filter data, focus in on specific nodes, and view impact and risk alongside in-flight operational activities such as incident, problem, change requests, and default or user-extended rules for the nodes. The client interface tools further provide a simple and flexible reporting engine, which provides an output including dashboards and reports, which may be scheduled to be distributed on a regular basis. The client interface tools provide administrators, system owners, and service owners with data to quickly identify configuration drift, unplanned changes, and incident history to understand the health of nodes they are responsible for and the operational activities directly or indirectly impacting those nodes.

Modules 510, 512, 514, 516 are provided for illustrative purposes only to identify implementations of the functionality of system server 500 and system management module 502. As such, other implementations of system server 500 and/or system management module 502 may accomplish the same or similar functions of those components, for example, wherein the same or similar functionality discussed with respect to modules 510, 512, 514, 516 is included within any number of modules, tools, or systems.

Figure 6:
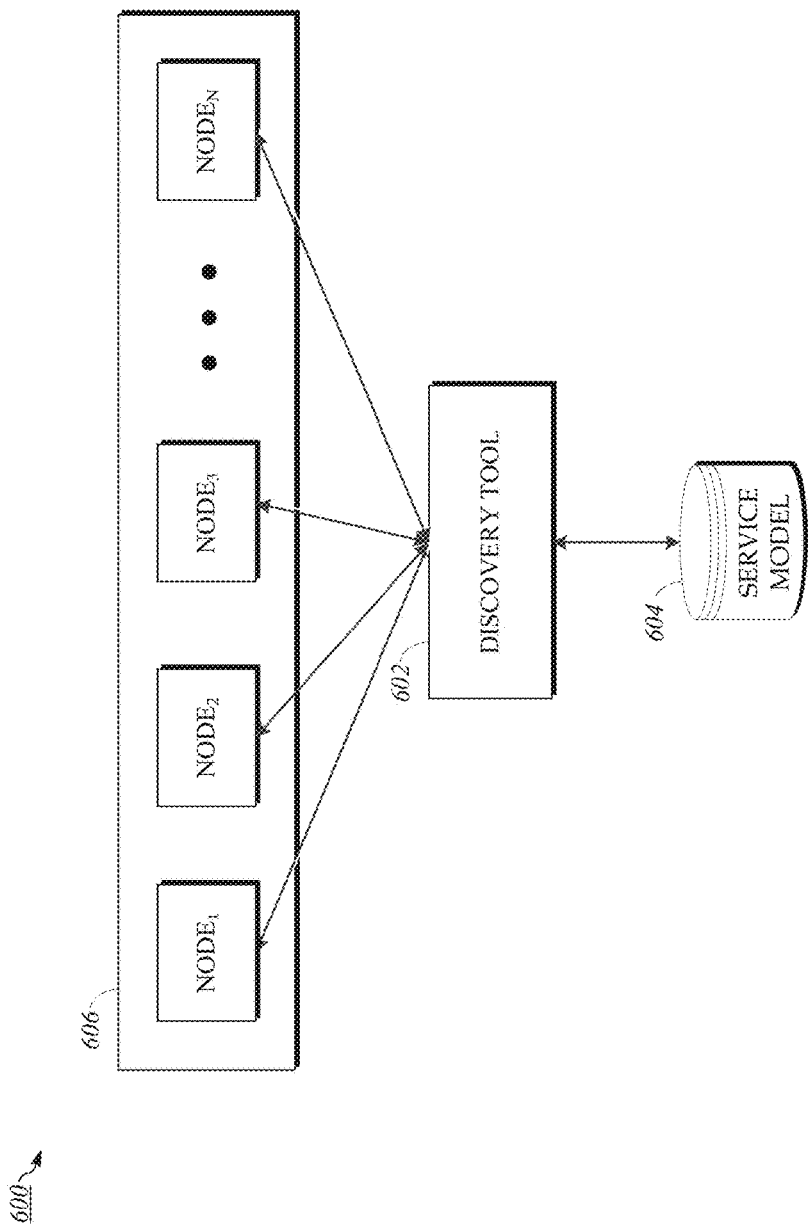
FIG. 6 is a block diagram of an implementation of a logic flow for data indicative of nodes of a configuration management database.

FIG. 6 is a block diagram 600 of an implementation of a logic flow for data indicative of nodes of a CMDB 606. In an implementation, CMDB 606, which may, for example, be CMDB 504, can be populated by client submissions including web service imports, direct database imports, and spreadsheet file imports. In an implementation, CMDB 606 may also or instead be populated via automated discovery and other methods conducted by or through system management module 502. For example, with auto discovery, discovery tool 602 performs a discovery process to locate resources used by a customer infrastructure for delivering services as part of service model 604. In an implementation, $NODE_1$ through $NODE_N$ represent hardware or software resources within a customer infrastructure.

In an implementation, discovery tool 602 can be installed within computing network 100, for example, as part of system server 500 operable with system management module 502. Discovery tool 602 can collect information about the resources associated with a customer infrastructure, including the hardware and software resources associated with a service model of the infrastructure and the relationships between those resources, which relationships can be based on the default and/or user-modified impact rules, as applicable. Discovery tool 602 can populate service model 604 based on the collected information.

Node data may be stored within a database, such as CMDB 606. The nodes may be populated in CMDB 606 in a number of ways. In an implementation, discovery tool 602 collects information about nodes within CMDB 606 or to be added to CMDB 606 via auto-discovery, which may be performed periodically and/or in response to a user- or system-initiated event, for example, changes made to the impact rules or node hierarchy. In an implementation, discovery tool 602 can be implemented within a datacenter, such as by installation on one or more of servers 232, 234 within datacenter 230, or on a separate cloud infrastructure control server. In an implementation, discovery tool 602 can be installed within a customer infrastructure, for example, on one or more servers within customers 210, 220. In an implementation, service model 604 can maintain a record of previous results of auto-discovery. In an implementation, node data may be imported into service model 604 by integrating service model 604 with a CMDB including but not limited to CMDB 606. Importing information about the nodes for populating CMDB 606 from an external source may be done through an import of information in a standard file format such as XML or CSV, which may then be transformed into appropriate tables and records in service model 604.

In an implementation, auto discovery may be performed in a top-down fashion. When discovery is performed top-down, an entry point can first be specified indicating how a service is consumed, for example, via a web service. In an implementation, an entry point can be a host, protocol, port, URL, or other set of parameters that indicates a location of a resource of the computer network. The entry point can be analyzed to identify one or more nodes to which various probes can be sent to obtain additional information. These probes can be configured to identify other nodes related by default to the initially discovered nodes as well as relationships for the nodes associated with applicable default impact rules. This process can be performed iteratively until no further nodes or relationships are discovered. Discovery tool 602 may further check such data for errors, normalize and transform the data, and load the data to capture the most recent and accurate profiles of the nodes.

In an implementation, in addition to top-down auto discovery, discovery tool 602 performs horizontal auto discovery by detecting nodes related to a given service model. For example, discovery tool 602 may identify nodes representing resources of other service models that have an effect on an impact calculation for one or more nodes of the given service model. In an implementation, discovery tool 602 includes instructions for performing horizontal auto discovery. In an implementation, horizontal auto discovery can be used to identify nodes that are not included as part of a service model, but which are associated with the operation of the service model as a whole or individual nodes of the service model. For example, using horizontal auto discovery, nodes used by a server to operate the service model, such as routers, switches, and the like, may be identified for impact calculation. In an implementation, discovery tool 602 performs horizontal auto discovery based on user-configured impact rules, for example, indicating that a node not part of the service model effects the impact calculation for one or more nodes of the service model. For example, discovery tool 602 may identify nodes to be associated with service model 604 based on impact rules for defining resource relationships between various hardware and hardware, software and software, and hardware and software resources of the customer infrastructure.

Vertical and horizontal discovery can be used to identify the nodes associated with resources of a service model. In an implementation, an entry point into the CMDB can be identified, for example, based on a URL entered by a user. Using the entry point, vertical discovery can be performed to identify the applicative resources involved in delivering the service related to the URL. Horizontal discovery can then be performed based on the identified applicative resources to identify the infrastructure resources that execute the applicative resources. Further vertical discovery can occur with respect to the identified infrastructure resources, and further horizontal discovery can occur with respect to further identified applicative resources, until the nodes for all resources related to the service have been discovered. In an implementation, vertical and/or horizontal discovery can occur with prior knowledge of applicative and/or infrastructure resource nodes, for example, where same were discovered during a previous discovery operation.

Figure 7:
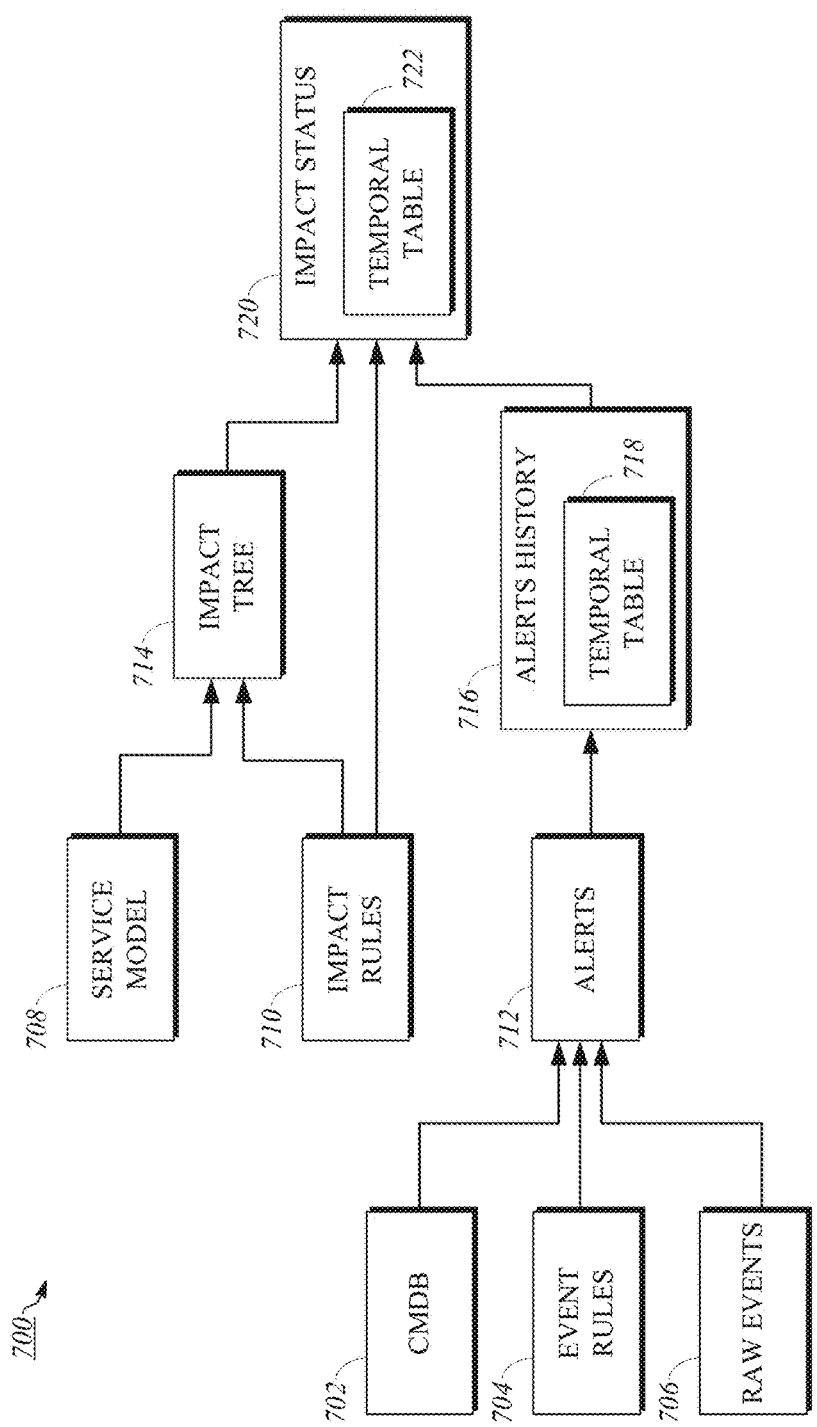
FIG. 7 is a block diagram of an implementation of a logic flow amongst components of a system server.

FIG. 7 is a block diagram 700 of an implementation of a logic flow amongst components of a system server, such as system server 500. In an implementation, diagram 700 can represent a scheduled worker for periodically or non-periodically monitoring for alerts and processing same by performing impact calculation.

In an implementation, alerts indicative of conditions of a customer infrastructure are processed based on service model 708, impact rules 710, and alerts 712. Service model 708 is a collection of nodes representative of at least a portion of a customer infrastructure. In an implementation, service model 708 can be identified by a discovery process, such as that discussed above with respect to FIG. 6. Service model 708 may be manually configured to include additional nodes not identified as associated with the subject customer service environment. The service model may be considered as a collection of related nodes, along with their relationships/dependencies as determined based on the default and/or user-modified impact rules. Services within a customer infrastructure can be formed of multiple layers like the customer instance described above. In a further example, a service may be composed of a web tier, an application tier, a cache tier and a storage tier that are grouped into individual clusters of multiple hosts/machines, also referred to as nodes. The tiers can have defined roles within the service.

In an implementation, impact calculation further includes considering nodes that are connected to, but are not necessarily a part of, a given service model, which connections may be referred to as infrastructure relationships. For example, infrastructure relationships may be indicative of alert impact between related hardware and software resources, various cluster types, or various virtual machine types or connectivity, such as where one corresponding resource is included in the service model. When it is determined that a received alert affects a node under an infrastructure relationship, that node may be included within the impact tree for the corresponding impact calculation and/or represented within the node hierarchy. A user may create infrastructure relationships by defining fields related to applicable child nodes, parent nodes, impact rules, and impact direction.

Impact rules 710 are instructions for processing identified alerts relative to the nodes of the service model. In an implementation, impact rules 710 can be default impact rules established, defined, or otherwise applied to nodes of service model 708; however, impact rules 710 may also or instead be manually configured, for example, by modifying elements of the default impact rules, adding new impact rules customized by the user, and/or removing default or customized impact rules. In an implementation, impact tree 714 can be a hierarchical tree indicative of dependency relationships between nodes of a service model as defined by impact rules and can therefore be generated based on service model 708 and impact rules 710. For example, impact tree 714 can comprise multiple tiers, wherein a first tier can represent nodes not dependent upon any other nodes and following tiers can represent nodes depending from nodes of a preceding tier. Thus, impact tree 714 can be indicative of the dependency relationships between nodes of service model 708, which dependency relationships are a basis for generating a corresponding node hierarchy. Implementations of node hierarchies and impact trees are discussed below with respect to FIGS. 9 and 10, respectively.

Alerts 712 indicate potential impairment of nodes associated with a given service model. In an implementation, alerts 712 are identified based on CMDB 702, event rules 704, and/or raw events 706. CMDB 702 is a configuration management database, such as CMDB 504, and includes data representative of nodes of multiple service models within a customer infrastructure. Event rules 704 are rules instructive for how and when alerts are received and processed. In an implementation, event rules 704 define how often alerts should be searched for, for example, by system management module 502, or how often identified alerts should be processed. Raw events 706 refers to information received regarding one or more resources of the customer infrastructure, for example, external to the customer infrastructure (e.g., from a third party service provider). In an implementation, raw events 706 includes identifying a request made for receiving or processing alerts, for example, using an application program interface (API), such as a representational state transfer API.

In an implementation, alerts can indicate a physical condition of a node. For example, a server can include a temperature sensor that measures the temperature of, for example, one or more CPUs, memory, or storage. The measurement can be collected, such as directly by, e.g., system server 500.

In an implementation, identified alerts can be processed using alerts history 716, which may be a table, cache, or other temporary storage for data indicative of the alerts. In an implementation, alerts history may comprise temporal table 718 for maintaining temporal data associated with identified alerts. For example, alert data identified by system management module 502 may be temporarily stored in temporal table 718 of alerts history 716 based on timestamps indicative of the times at which the alerts were identified. Based on event rules 704 and/or other instructions included within and/or provided to system management module 502, temporal table 718 may be configured to communicate identified alert data at only predetermined or modifiable time intervals. In this way, alerts history 716 may store the identified alerts in a temporary storage until the next time interval is reached, at which time any data stored in temporal table 718 can be processed. In an implementation, temporal table 718 can store data other than temporal data.

In an implementation, temporal table 718 can be a historical table used for identifying valid alerts (e.g., alerts to use for performing a given impact calculation operation). Validity may refer, for example, to the period of time during which the alert is applicable, or valid time, for the alert. In an implementation, temporal table 718 includes fields indicative of the valid time for alerts, such as a valid time start time indicative of a time at which the alert becomes valid and a valid time end time indicative of a time at which the alert ceases to be valid. In an implementation, the valid time start time for an alert can be represented by a timestamp recorded at the time the alert is identified. In an implementation, the valid time end time for the alert can be represented by a timestamp indicative of an impact calculation operation performed based on the alert. In an implementation, the valid time end time for the alert can be represented by a timestamp recorded at the time an update to or replacement for the alert is identified. For example, where the alert indicates a medium severity for a database, its valid time end time may be the time at which a new alert indicating a cleared severity for the database is identified.

Impact status 720 can be a structure, such as a table, for indicating information about impact calculated for nodes identified by impact tree 714 (and a corresponding node hierarchy) via service model 708. An example of an impact status table is discussed in further detail below. In an implementation, in response to receiving data from impact tree 714 and alerts history 716, impact status 720 indicates the results of impact calculation performed for nodes of service model 708 based on how alerts 712 are applied to impact rules 710. For example, impact status 720 may display data representative of applicable alerts indicative of an overall degree to which the alerts affect service model 708 and/or data representative of applicable nodes indicative of an overall degree to which those nodes are affected by alerts 712.

As with alerts history 716, in an implementation, impact status 720 may comprise a temporal table 722 for storing temporal data associated with impact status data. For example, the results of a performed impact calculation may be temporarily stored in temporal table 722 of impact status 720 based on the time they are processed, for example, using a timestamp indicative of the time of processing. Based on event rules 704 and/or other instructions included within and/or provided to system management module 502, temporal table 722 may be configured to display processed impact calculation data at only predetermined or modified intervals or upon the occurrence of some event, for example, identifying a change to one of the severity for a node or the node hierarchy. In this way, impact status 720 may store the processed impact calculation data in a temporary storage until the next time interval has been reached or event has occurred, at which time the data stored in temporal table 722 can be indicated (e.g., as output to a display).

In an implementation, temporal table 722 can be a historical table used for storing impact values calculated using valid alerts from temporal table 718. In an implementation, temporal table 722 can include fields representative of a start time of the impact calculation operation from which the impact data were generated. In an implementation, and as with temporal table 718, temporal table 722 can store data other than temporal data.

In an implementation, the validity of alerts stored in temporal table 718 can be determined based on one or more timestamps indicative of times at which impact calculation operations are performed. For example, first and second timestamps may be used, wherein the first timestamp can be indicative of a start time of a current (e.g., new) impact calculation to be performed and the second timestamp can be indicative of a start time of a previous (e.g., most recently performed) impact calculation. In an implementation, an alert can be valid for performing a current impact calculation where the valid time start time for the alert is earlier than or equal to the second timestamp and where the valid time end time for the alert is later than the second time stamp and earlier than the first timestamp. As such, an alert can be considered valid with respect to a current impact calculation operation if it was identified before and remains valid after a previous impact calculation operation was performed. For example, where an alert indicating a medium severity is identified for a database node, an impact calculation is performed on that node based on the alert, and an updated alert indicating a cleared severity can be identified after the impact calculation is performed, the original alert is no longer valid for a new impact calculation operation to be performed. However, where no updated alert is identified after the impact calculation is performed, the original alert can remain valid, for example, so that it can be used for the new impact calculation operation.

The logic flow of block diagram 700 further indicates how impact calculation may be performed for nodes to which identified alerts apply. In an implementation, generating the node hierarchy can mean creating data indicative of applicable nodes and impact rules, identifying previously created data indicative of applicable nodes and impact rules, selecting previously created data indicative of applicable nodes and impact rules from a list or set of such data, determining particular such previously created data from such list or set based on desired or necessary characteristics of the data, or any other manner of preparing the node hierarchy for subsequent use. In an implementation, generating the node hierarchy may require new data be received from a user in order to properly prepare the node hierarchy, or it may alternatively use only data already in storage. In an implementation, generating the node hierarchy can include generating data indicative of a graphical user interface of the node hierarchy, which data may be output to display on a computer, such as one or more client computers (e.g., clients 212, 214, 222, 224).

Regardless of the particular implementation, the node hierarchy can be generated based on nodes associated with a service model of a customer infrastructure and impact rules associated with those nodes, which impact rules define the manner in which the nodes are connected. In an implementation, generating the node hierarchy includes performing a discovery process, such as the discovery process discussed above with respect to FIG. 6, to identify the nodes comprising the node hierarchy (e.g., by using vertical discovery to identify nodes included within the underlying topology of a service model and horizontal discovery to identify nodes associated with nodes of the underlying topology).

In an implementation, generating a node hierarchy first comprises identifying nodes associated with a service model. This may include identifying an underlying topology of a service model comprising nodes that are included as part of the service model and then identifying nodes related to the nodes of the underlying topology that are not themselves included in the service model. The former may be done, for example, using vertical discovery to identify nodes of the service model. The latter may be done, for example, using horizontal discovery to identify nodes related to, but not actually included in, the service model.

In an implementation, the nodes associated with the service model define an initial hierarchy of dependency relationships subject to modification by the impact rules to be applied. That is, for example, vertical discovery may initially generate a multi-leveled topology of nodes of the service model including top-down connections between the nodes. Horizontal discovery may thereafter add to this multi-leveled topology by connecting nodes related to nodes of the service model directly to the related nodes, for example, on a same or different level of the topology. As discussed above, a node may be considered related to a node of a service model where a severity of the former has an effect on a severity of the latter.

In an implementation, impact rules applicable to the nodes associated with the subject service model are next identified. The impact rules indicate the nature of the dependency between given nodes and surrounding nodes, including self-severity vector for the nodes and contribution vector for calculating an impact value for parents of the nodes. The self-severity vector can be indicative of a degree to which an alert affects the severity of a given node independent of the plurality of relationships. The contribution vector can be indicative of a degree to which children of a given node affect the severity of the node and is comprised of various contribution percentages. For example, in a cluster of five nodes, where the cluster is considered affected only if at least three of the nodes are affected, each node of the cluster will have a contribution percent of approximately 33 percent. In an implementation, the extendable rules can be initially set to default values representative of typical relational data for the corresponding nodes. However, the extendable rules are subject to modification (e.g., by a client/user or administrator) to redefine the relational data as desired. In an implementation, a relationship can be indicative of a degree to which the severity of a given child node contributes to the severity of a parent node. Node hierarchy 900 can be generated using configurable impact rules for defining the relationship strategies, depending, for example, on the specific topology underlying the subject service model. In an implementation, the impact rules are initially defined based on default settings generally applicable to the corresponding resources of the service model.

In an implementation, default impact rules are available for impact calculation. For example, a default impact rule for calculating impact for hosts in a cluster of resources indicates how host cluster member affect an overall status of the cluster, which may be based on a percentage or number of cluster members. Thus, where a three-host cluster requires a fifty percent influence to set the severity to "major," each member can be considered to have a seventeen percent influence (e.g., the requirement divided by the number of host cluster members). Another example of a default impact rule may apply the same or similar logic to cluster members, generally. Other examples may include rules for defining impact propagation for nodes in infrastructure relationships, determining the extent to which an impact applies to parent or child nodes within a given service model, limiting impact to not affect child nodes of effected nodes, and determining how impact applies to network or storage nodes involving redundancies.

In an implementation, a user may modify one or more default impact rules as desired to reconfigure the manner in which impact is performed. In an implementation, a user may modify a list of available impact rules, for example, by defining new rules to be used in impact calculation. In an implementation, modification of default impact rules and/or defining new impact rules includes determining the nodes associated with a service model to which the impact rule applies (e.g., only parent nodes, only nodes in clusters, only applicative resources, etc.), setting values indicative of the degree to which severity of a node influences impact of another node (e.g., how child severity affects a parent node where impact direction is from child to parent, or how parent severity affects a child node where impact direction is from parent to child), and indicating impact based on a calculated severity.

In an implementation, based on the applicable resource, the extendable rules may indicate a strategy for connecting a given node to the node hierarchy and/or providing a contribution vector to be used in calculating the impact value of a parent node. For example, by default, an extendable rule for a host resource may indicate that the host is to be connected as a child node to all resources running on the host, and an extendable rule for a hypervisor resource may indicate that the hypervisor is to be connected as a child node to the host, where the hypervisor resource has a 100 percent contribution percentage with respect to the host.

By changing the values for extendable rules, applicable nodes may be adjustably connected to different portions of the node hierarchy, may be connected to a larger or smaller pool of parents and/or children, include different values for the self-severity vector and/or contribution percentage, etc. The default values for the extendable rules may be replaced or supplemented, at the discretion of the party changing the values. In an implementation, the node hierarchy can be updated in response to a change being made to the impact rules. In an implementation, the default parameters for the impact rules may be maintained separate from user-configured versions of the impact rules, for example, so that a user may selectively choose to apply default or configured parameters to nodes.

The node hierarchy can thus be generated based on the identified nodes and applicable impact rules. In an implementation, generating the node hierarchy comprises identifying changes to the service model topology imposed by the applicable impact rules, for example, to move the location of nodes within the topology. In an implementation, generating the node hierarchy comprises determining various characteristics of the identified nodes based on the applicable impact rules. For example, generating the node hierarchy may comprise determining which nodes are child nodes, which nodes are parent nodes of corresponding child nodes, relationship between child nodes and their parent nodes, the direction of impact as calculated based on the relationships (e.g., parent to child or child to parent), etc.

In an implementation, a preliminary node hierarchy based on the resources associated with a subject service model can be generated before impact rules are applied. For example, service resources associated with the subject service model including dependency relationships between the service resources may be mapped to provide the framework for the node hierarchy to be generated. The infrastructure resources corresponding to the identified service resources may then be identified and associated with the service resource mapping. This may be implemented, for example, by connecting nodes representative of the service resources to the nodes representative of the corresponding infrastructure resources, or by generating separate layers for the service resources and corresponding infrastructure resources and indicating a mapping for relating nodes of the layers. In an implementation, data representative of the nodes may be identified from a network topology representing the hierarchy of and relationships between the nodes of the subject service model.

Once the node hierarchy is generated, alerts pertaining to the node hierarchy may be identified. In an implementation, identifying the alerts can mean identifying data indicative of alerts presently stored in connection with the customer infrastructure, identifying data indicative of alerts stored in a source external to the customer infrastructure by downloading or otherwise receiving the data from the external source, determining alerts to be identified based on a given context (e.g., for a given service model of the customer infrastructure), selecting alerts to be processed from a list or storage (e.g., a cache or temporal table for temporarily storing data indicative of the alerts), calculating alerts based on data concerning resources of a given service model associated with one or more sources internal or external to the customer infrastructure, or any other manner for identifying the alerts.

The alerts are indicative of notifications of planned maintenance operations or any other configuration changes for resources of the customer infrastructure. For example, a planned maintenance operation may result in resources such as a switch, router, server, and the like having reduced or no capacity. Impairment may be defined in various ways to suit the intended application, but some examples include decisions based on features such as some or all of: component failure, slow response time, impaired availability, substandard consistency metrics, substandard reliability metrics, reduced bandwidth, status request failures, substandard route analytics, excessive memory usage, substandard CPU performance, poor network performance, low disk space availability, failed processes, certain HTTP return codes, certain SNMP traps, certain traffic flow volume or patterns, etc. Planned maintenance also encompasses system changes such as adding, removing, reconfiguring, or modifying system resources. For example, in an implementation wherein a data structure is used to maintain data related to various alerts processed or to be processed in connection with the node hierarchy, identifying the alerts may include identifying alerts stored in the data structure by querying the data structure for alert data and identifying alerts not stored in the data structure by intercepting a queue of alert data from the service management module. In an implementation, alerts are identified with respect to discrete time intervals.

In one implementation, planned changes may be defined by a user, for example, by selecting one or more nodes in a CMDB, defining in words the type of changes planned, and indicating the date on and time at which the change will be done. A change request may undergo various stages until it is approved and executed. Planned changes may also be defined in other ways, such as via automatic remediation processes. A change request may or may not be effective until one or more authorized persons have approved the change. Whether or not or how a change request must be approved may vary depending on, for example, the potential impact or effect of the change. The alerts may further describe routine maintenance or other computing network changes not defined or planned by a client/user or administrator. For example, the one or more alerts may be indicative of sudden system changes reactive to security concerns or necessitated as a result of a resource becoming corrupted.

Impact calculation may then performed based on the identified alerts. This may include, for example, the system management module analyzing the state of the resources of the customer infrastructure, which includes identifying resources experiencing complete or partial functional impairment. In an implementation, performing impact calculation comprises the system management module identifying nodes of the node hierarchy having a self-severity vector that changed in response to one or more identified alerts. That is, impairment based on an identified alert can be reflected by affected nodes having a changed self-severity vector, which may be indicated using a flag, such as a bit for distinguishing between changed and unchanged values. In an implementation, and as discussed below with respect to FIG. 9, the flag may be graphically represented as part of the node hierarchy to depict the status of applicable nodes as being flagged for impact calculation. In an implementation, a common data structure may be used to track the nodes of the node hierarchy that are flagged at any given time. As a result of performing impact calculation, severity for nodes affected by the identified alerts can be determined based on a severity vector for each affected node. In an implementation, a data structure may be included, for example, within the system management module, for identifying the nodes of a node hierarchy that have been flagged for impact calculation. For example, the data structure may be a queue of nodes to be processed or a table for storing and representing data indicative of those nodes.

In an implementation, the severity vector comprises a self-severity vector representative of a degree to which the identified alert affects the severity of the node independent of the effect on any other nodes. In an implementation, the severity vector comprises a contribution vector representative of a degree to which a severity of nodes from which a given node depends affects the severity of the given node. In an implementation, the self-severity vector and contribution vector for a node include a list of impact categories and a value, such as a percentage, associated with each category. For example, the impact categories may define a range of significance from a minimally significant category (e.g., info/clear) indicative of no change to node severity being identified based on an alert, to a maximally significant category (e.g., critical) indicative of a severe change to node severity being identified based on an alert, with incrementally heightened categories intermediately defined (e.g., warning, minor, and major). In an implementation, the vectors do not include a category indicative of no change to node severity being identified, wherein that indication is instead made by the values of the vector categories remaining unchanged in view of the identified alerts. Any value can be used for indicating impact provided that a threshold is recognized for identifying a controlling severity. Further, in iteratively calculating impact for the node hierarchy, certain nodes may have their impact values calculated more than once for a given alert or set of alerts.

The node hierarchy may thereafter be updated based on the calculated impact values calculated. In an implementation, updating the node hierarchy comprises updating indications representative of severity for each value having changed in response to the impact calculation performed. For example, aesthetic indicators, such as the colored bricks discussed below with respect to FIG. 9, may be updated to reflect a new severity calculated for the corresponding resource. In an implementation, the node hierarchy can be updated even where no change is identified in response to calculating impact, for example, where a change is identified with respect to the impact rules, the underlying topology of the subject service model, the resources associated with the underlying topology, and/or any other configurable settings with respect to the resources comprising the node hierarchy. In an implementation, one or more of the impact tree, alert table, impact rule table, and impact status table may be updated along with the node hierarchy.

Figure 8:
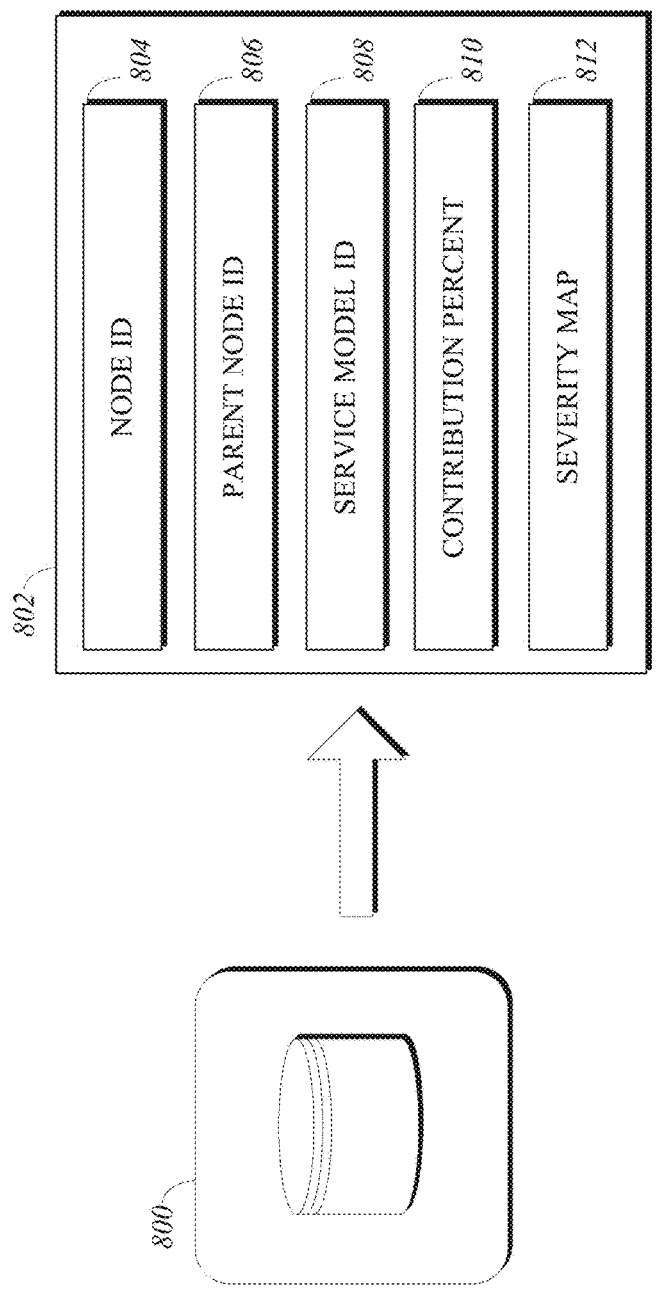
FIG. 8 is a diagram of an implementation of data associated with a node of the node hierarchy.

FIG. 8 is a diagram of an implementation of data 802 associated with a node 800 of a node hierarchy. As discussed above, node 800 represents a resource associated with a service model of a customer infrastructure (e.g., customers 210, 220). Data 802 may include any data useful for identifying node 800 and calculating impact for node 800 and other nodes depending from node 800. In an implementation, data 802 comprises node identifier 804, parent node identifier 806, service model identifier 808, contribution percent 810, and severity map 812.

Node identifier 804 can be a character or set of characters for identifying the resource represented by node 800. For example, node identifier 804 may be a number that, when referenced in an index or other list, indicates an association to the subject resource. In an implementation, node identifier 804 can be a unique character string or integer assigned to represent the resource represented by node 800. In an implementation, node identifier 804 is assigned based on one or more characteristics shared by node 800 and other nodes, for example, nodes connected within a service model to node 800. In an implementation, node 800 can be represented by the same node identifier 804 regardless of the service model presently considered for impact calculation. In an implementation, node 800 may be represented by different node identifiers 804 in each service model with which it is associated. Parent node identifier 806 can be a node identifier (as described above with respect to element 804) associated with a parent of node 800. As previously discussed, a parent node is a node from which a current node, such as node 800, depends, and thus that can be affected by a change in severity of node 800. Service model identifier 808 can be an identifier similar to node identifier 804 and parent identifier 806, but representative of a service model.

Contribution percent 810 can represent a degree to which a severity of node 800 affects a severity of a parent node, for example, the parent node identified by parent node identifier 806. In an implementation, node 800 may have multiple parent nodes, and thus contribution percent 810 may apply to each of them. In an implementation, contribution percent 810 can be based on the resource represented by node 800 and/or other resources associated with nodes connected to node 800. For example, where node 800 represents a resource in a cluster of five resources and the severity of the cluster can be changed where the severity for three of those resources has changed based on an alert, contribution percent 810 is 33%. Although contribution percent 810 is expressed as a percentage value, it can instead be expressed in any other unit suitable for conveying portions.

Severity map 812 can be a map indicative of the effect of a severity from node 800 as a child node to a corresponding parent node, such as the parent node identified by parent node identifier 806. Severity map 812 may be particularly useful based on the nature of the relationship between node 800 and its parent node. For example, where a network path is identified between node 800 and its parent node, an alert listed as "CRITICAL" on a redundant network element may be considered only "MAJOR" for the network path in that redundancy allows communication to continue on that path.

Although data 802 is illustrated as being associated with node 800, data 802 may be associated with any node of the node hierarchy. While data 802 is shown as including data items 804, 806, 808, 810, and 812, other data elements not shown or herein disclosed may also be associated with a given node of the node hierarchy. Similarly, it may be the case that the data associated with a given node of the node hierarchy does not include one or more of the data items shown or that it includes data elements not shown and exclude data elements that are shown. However, each node of the node hierarchy is associated with at least some data elements.

Figure 9:
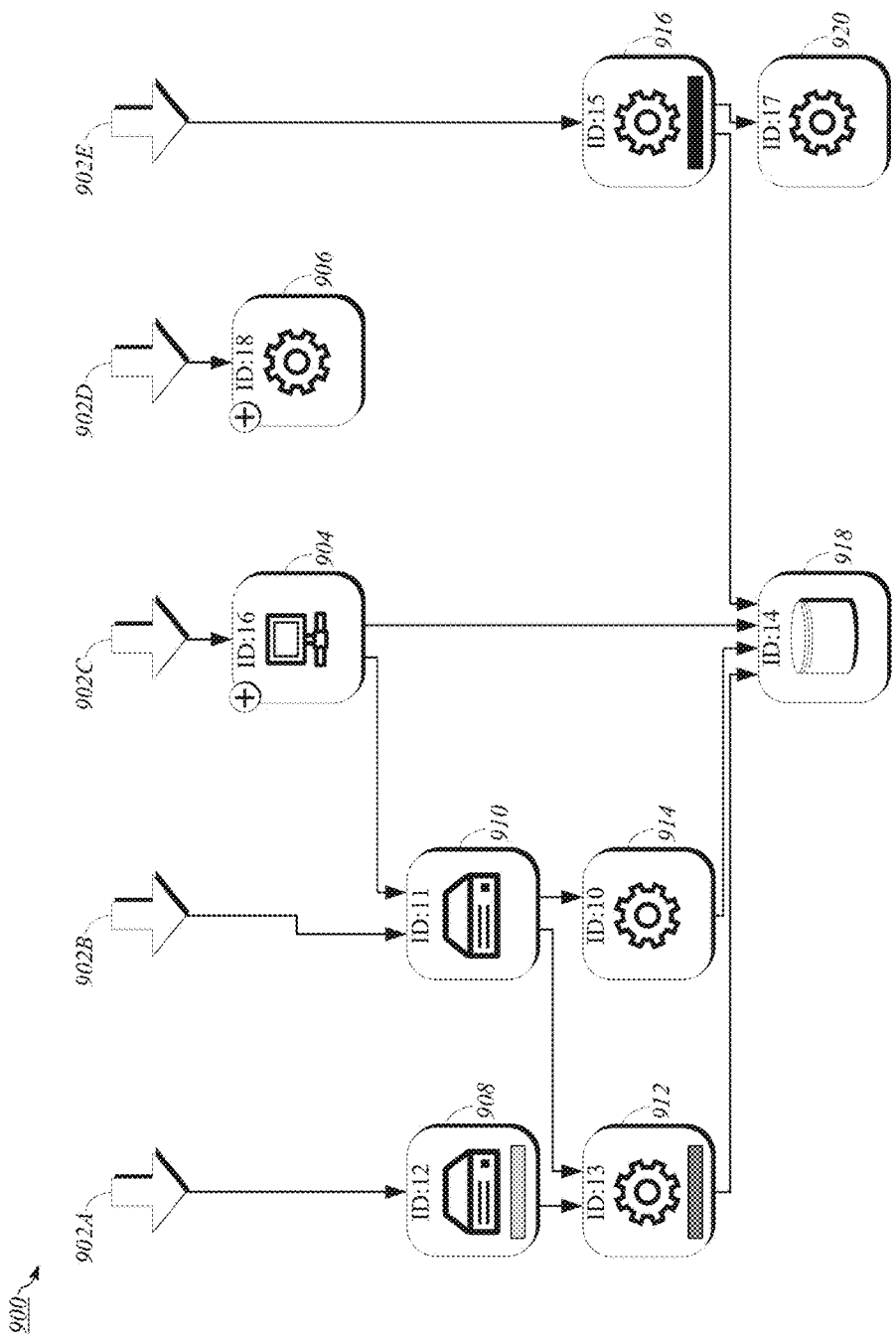
FIG. 9 is an illustration of an implementation of a node hierarchy representative of resources of a service model.

FIG. 9 is an illustration of an implementation of a node hierarchy 900 representative of resources associated with a service model. As previously discussed, node hierarchy 900 comprises nodes representative of resources associated with a service model of a customer infrastructure, which nodes are connected by edges representative of the relationships between the corresponding resources. For example, a relationship may represent dependency of a one node by another (e.g., a parent node being dependent upon a child node). Thus, in an implementation, a relationship may be indicative of a contribution vector for calculating impact of a parent node.

Node hierarchy 900 can be generated by applying impact rules to nodes associated with a service model. In an implementation, resources represented by the nodes comprising node hierarchy 900 may natively be included in a subject service model, a different service model, or multiple service models. In this way, resources shared by various service models or related to resources native to a subject service model may, for example, be associated with the subject service model and included nodes of node hierarchy 900. In an implementation, node hierarchy 900 may be updated upon a change being identified with respect to the underlying topology of the subject service model (e.g., as a result of vertical discovery, such as where a node has been moved within, added to, or removed from the topology), the infrastructure topology related to resources of the subject service model (e.g., as a result of horizontal discovery, such as where an infrastructure resource corresponding to an applicative resource within the service model is identified), or applicable impact rules (e.g., as a result of identifying changes made to node hierarchy 900 or changing the strategy for connecting nodes of node hierarchy 900). In an implementation, only the portions of node hierarchy 900 affected by a change are updated, for example, in order to preserve time and system processing power.

In an implementation, node hierarchy 900 can be a directional map of nodes representing resources associated with a service model of a customer infrastructure. An entry point into node hierarchy 900, such as entry points 902A, 902B, 902C, 902D, 902E, can represent a flow of or path for data processing with respect to the nodes of node hierarchy 900, for example, by indicating a first resource associated with the service model to process a request by the service model. The directional paths of node hierarchy 900 can flow from nodes at a lowest level of node hierarchy 900 up to a corresponding entry point and are indicative of dependency relationships between the nodes. For example, arrows pointing from a first node, such as node 904, to a second node, such as node 910, indicate that the second node depends from the first node and thus that a severity of the second node may contribute to the severity of the first node. Nodes that depend from other nodes are referred to as child nodes and the nodes from which child depend are referred to as parent nodes. Defining these relationships can be useful, for example, for performing impact calculation on parent nodes based on impact values calculated for corresponding child nodes.

In an implementation, and as shown in the figure, node hierarchy 900 comprises nodes 904, 906, 908, 910, 912, 914, 916, 918, 920. Node 904 represents a network resource, for example, Ethernet switches, a network router, a load balancer, etc. Nodes 906, 912, 914, 916, 920 represent software resources, for example, web-based applications operable on a Java Virtual Machine, interface software for use with a database, firmware for operating a connected hardware resource, Javascript for configuring platform software, etc. Nodes 908 and 910 represent storage resources, for example, network attached storage, direct-attached storage, backup and/or recovery servers, etc. Node 914 represents a database resource, for example, for storing information usable in connection with a web-based application or platform. The foregoing examples, including the specific resources listed and connections described, express or implied, are non-limiting.

In an implementation, only some of the nodes of node hierarchy 900 are included by default within the underlying topology of the subject service model. For example, a service model for executing web-based platform software may by default only include resources corresponding to nodes 906, 912, 914, 916, 918. Thus, various instructions for interacting with the platform software and processing requests for data stored in a database used by the platform may comprise the underlying topology. In an implementation, a discovery process may be used to identify resources corresponding to those of nodes 906, 912, 914, 916, 918. For example, horizontal discovery may probe service models or other aspects of a CMDB for instances of a default resource of the subject service model to identify related resources represented by nodes 904, 908, 910, 920. In an implementation, nodes 904, 908, 910, 920 are identified because it is determined that the severity of those nodes affects the severity of at least one node already included within the service model. For example, database interface software of node 914 may not be able to function properly if the device upon which its instructions are stored, node 910, is undergoing planned maintenance. Thus, to fully monitor the health and status of the service model, node hierarchy 900 can also include node 910.

In an implementation, node hierarchy 900 may be graphically depicted using arrows representing dependency relationships to connect tiles representing resources of the subject service model. As used herein, the term "tiles" refers generally to an icon, label, tag, or other designator of a resource, regardless of aesthetic characteristics such as shape, size, color, border, etc. In an implementation, a tile can include an indication of the respective node's identifier. For example, and as shown in the figure, the tile may include "ID:N" where N indicates a unique or shared identifier used to identify the node. In an implementation, tiles representing nodes of node hierarchy 900 may include symbols or illustrations representative of functionality of the corresponding resource. For example, tile 918 represents a database having identification number 14. Thus, tile 918 includes a depiction of a database icon. In an implementation, a depiction on a given tile may be generic based on the type of resource represented by the tile or specific based on the particular characteristics of the represented resource.

Additional features or descriptors for associated resources may be graphically depicted using tiles. In an implementation, an indication that a new alert applicable to a tile has been identified may be included. For example, the tile may display a "+" to indicate that a new alert will be processed with respect to the corresponding resource, such as shown on nodes 904, 906. In an implementation, the indication that an alert to be processed has been identified with respect to a node may be made using a flag, which may, for example, be graphically depicted on a tile, indicated in a data header pertaining to the resource, stored in a temporary table representative of nodes for which impact calculation is to be performed, etc. In an implementation, an indication of the severity associated with a resource may be included on a corresponding tile. For example, the severity may be indicated using a color-coded block located on the tile. Thus, as shown in the figure, the tiles indicate that node 912 has a higher severity than node 908, which has a higher severity than node 918.

Figure 10:
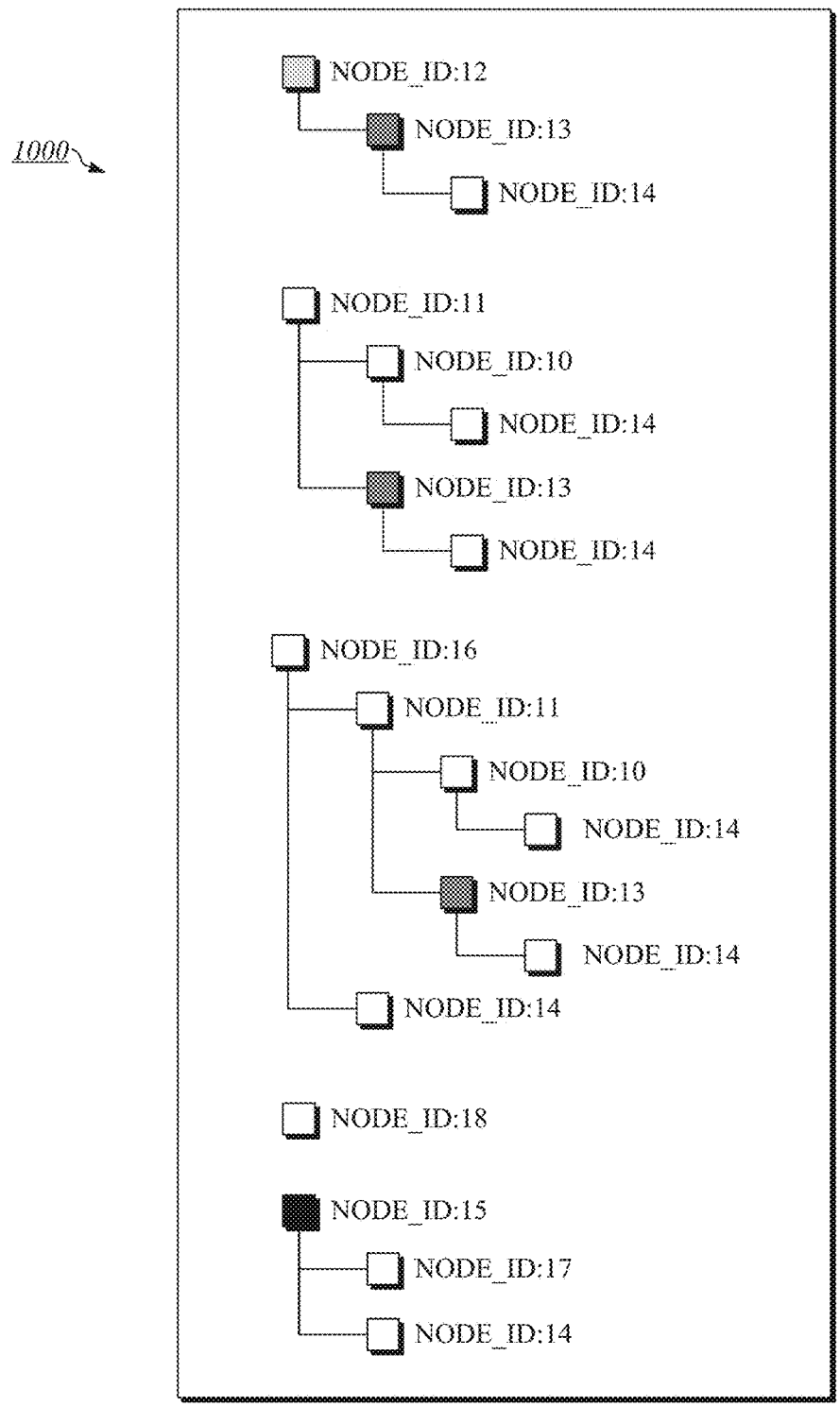
FIG. 10 is an illustration of an implementation. of an impact tree representative of a hierarchy of resources associated with a node hierarchy.

FIG. 10 is an illustration of an implementation of an impact tree 1000 representative of a hierarchy of resources associated with node hierarchy 900. Impact tree 1000 is a hierarchical tree indicative of dependency relationships between nodes of the service model of node hierarchy 900. In an implementation, a group of parent and child nodes, for example, NODE_ID:12, NODE_ID:13, and NODE_ID:14 as shown at the top of the figure, may be referred to as a "set" or "set of nodes." In an implementation, impact tree 1000 can be generated or otherwise determined based on node hierarchy 900 and an impact status table, discussed below, for example, where severity for nodes is indicated by the impact status table or another table, such as table 1200 of FIG. 12.

In an implementation, impact tree 1000 includes at a first tier parent nodes that are not dependent upon any other parent nodes of the subject service model, wherein each subsequent tier includes child nodes of the indicated parent node of the previous tier. For example, referring to the aforementioned set, NODE_ID:12 is depicted at a first tier of the set and is therefore a parent node not dependent upon any other parent nodes. NODE_ID:13 is depicted at a second tier of impact tree 1000 and NODE_ID:14 at a third tier of impact tree 1000. This is because NODE_ID:13 is a child node of NODE_ID:12, and NODE_ID:14 is a child node of NODE_ID:13. In an implementation, impact tree 1000 includes a depiction or other indication of the entry point corresponding to a given set of nodes (e.g., a URL directing a user to a resource represented by a parent node of a first tier of impact tree 1000). In an implementation, and as shown in the figure, impact tree 1000 does not include a depiction or other indication of the corresponding entry point, but depicts the beginning of a set of nodes using the parent node of the first tier of the set.

A graphical representation of impact tree 1000 may be included, for example, as part of a graphical display region, to visually indicate the dependencies of the nodes of node hierarchy 900. In an implementation, the graphical display region including a graphical representation of impact tree 1000 can include functionality for collapsing aspects of impact tree 1000. For example, sets of impact tree 1000 may be collapsed according to a parent node at a first tier of the set, or, in implementations wherein an entry point is included, according to the entry point. A user may selectively collapse a set of nodes of impact tree 1000, for example, by toggling an icon (not shown) located near the set. In an implementation, the graphical user interface includes an indication of a severity associated with the nodes of impact tree 1000. For example, severity may be indicated using color-coded blocks located near the nodes of impact tree 1000. Thus, as shown in the figure, NODE_ID:13 is shown as having a higher severity than NODE_ID:12, which is shown as having a higher severity than NODE_ID:14.

In an implementation, a user may reconfigure the node hierarchy (and thus the nodes associated with the underlying service model) by modifying impact tree 1000. For example, a user may click and drag a node of impact tree 1000 to a different set or location of impact tree 1000. In this way, NODE_ID:14 could be made a parent node of NODE_ID:13 in the topmost set shown, NODE_ID:17 could be made a child node of NODE_ID:10 in the second topmost set shown, etc. In an implementation, the user may modify impact tree 1000 by adding new nodes and/or removing existing nodes from impact tree 1000. For example, a user may switch the database represented by NODE_ID:14 with a new database represented by NODE_ID:30, or add NODE_ID:30 as a child node to parent nodes of NODE_ID:14 to provide redundancies for that database. In an implementation, modifications made to impact tree 1000 are also shown in corresponding node hierarchy 900, which may, for example, be updated upon a modification being made or be completely re-generated.

Other information concerning the nodes of node hierarchy 900 may be included within impact tree 1000. For example, impact tree 1000 may include a description of the node, such as its resource type and/or functionality, a description about the functionality a set of nodes provides for the service model, an indication as to whether the node is at a default or modified location within impact tree 1000, etc. Further information beyond what is explicitly described above and as may be useful for understanding the relationships between nodes and the functionality of the nodes may be included in impact tree 1000, as well.

FIG. 11 is an illustration of an implementation of an alert table 1100 for storing alert data indicative of valid alerts for use in performing impact calculation. Table 1100 may be included as part of a user interface, for example, as part of a graphical display region constituting data reflecting information ultimately destined for display on a hardware device, such as one or more of customers 210, 220 or clients 212, 214, 222, 224. In an implementation, table 1100 can be used to store and represent data processed in connection with alerts history 716 of FIG. 7. In an implementation, table 1100 can be a structural implementation of alerts history 716 (e.g., as temporal table 718). In an implementation, the data stored in and represented by table 1100 can be dependent upon instructions relative to temporal table 718 of alerts history 716, for example, for determining whether or not data should be represented based on a time value.

Table 1100 comprises row data indicative of alerts identified as being associated with one or more resources of a CMDB (and, namely, with a service model) and column data representative of various fields corresponding to the data indicative or representative of the alerts. In an implementation, table 1100 organizes data for alerts into column data indicative of a number assigned to identify the alert, an initial severity associated with the alert based on its impact on applicable nodes, the node or nodes for which the alert was identified, a valid time start time, and a valid time end time.

Additional fields may also be included within table 1100. For example, table 1100 may include a "Description" column for indicating a general or detailed description of the alert being processed for a user's reference and convenience. In another example, table 1100 may include a "Source" column for indicating a source of the alert being processed. A user may consider it desirable to refer to the source for information about the alert, such as where the alert has a significant effect on the applicable service model, is one of a group of identified alerts from the same source, or the subject matter of the alert is unknown to the user. Table 1100 may further include other fields as may be deemed useful for the user.

Further, the fields described above and as may be included within table 1100 may be displayed according to a code or other defined association. In an implementation, the values listed in the "Severity" column may be color coded according to significance (e.g., wherein red represents a highest significance and blue represents a lowest significance). For example, the severity field of table 1100 for Alert0010044 may be graphically represented by an orange color segment or color fill indicating that the alert is identified as having an initial severity value of "MAJOR" with respect to the node or nodes to which it applies.

FIG. 12 is an illustration of an implementation of an impact table 1200 for storing impact values generated in response to performing impact calculation using valid alerts. Table 1200 may be included as part of a user interface, for example, as part of a graphical display region constituting data reflecting information ultimately destined for display on a hardware device, such as one or more of customers 210, 220 or clients 212, 214, 222, 224. In an implementation, table 1200 is used to store and represent data processed in connection with impact status 720 of FIG. 7. In an implementation, table 1200 is a structural implementation of impact status 720 (e.g., as temporal table 722). In an implementation, the data stored in and represented by table 1200 is dependent upon instructions relative to temporal table 722 of impact status 720, for example, for determining whether or not data should be represented based on a time value.

Table 1200 comprises row data indicative of impact values generated in response to performing an impact calculation operation using valid alerts, such as the alerts indicated by the alert data of table 1100 of FIG. 11, and column data representative of various fields corresponding to the data indicative or representative of the impact values. In an implementation, table 1200 organizes data for impact values into column data indicative of an identification of the node or nodes to which an impact value applies, the severity indicative of the impact value, an identification of the alert or alerts upon which the impact calculation was based, and a timestamp indicative of a start time at which the impact calculation operation was performed.

Further, and as with table 1100 of FIG. 11, the fields described above and as may be included within table 1200 may be displayed according to a code or other defined association. In an implementation, the values listed in the "Severity" column may be color coded according to significance. In an implementation, the color represented in a field of table 1200 may be graphically indicated in a node hierarchy on the node corresponding to the alert. For example, the tile representing Node_ID:18 in a node hierarchy may include a red color segment indicating that an alert identified relative to that node has an initial severity value of "CRITICAL."

Figure 13:
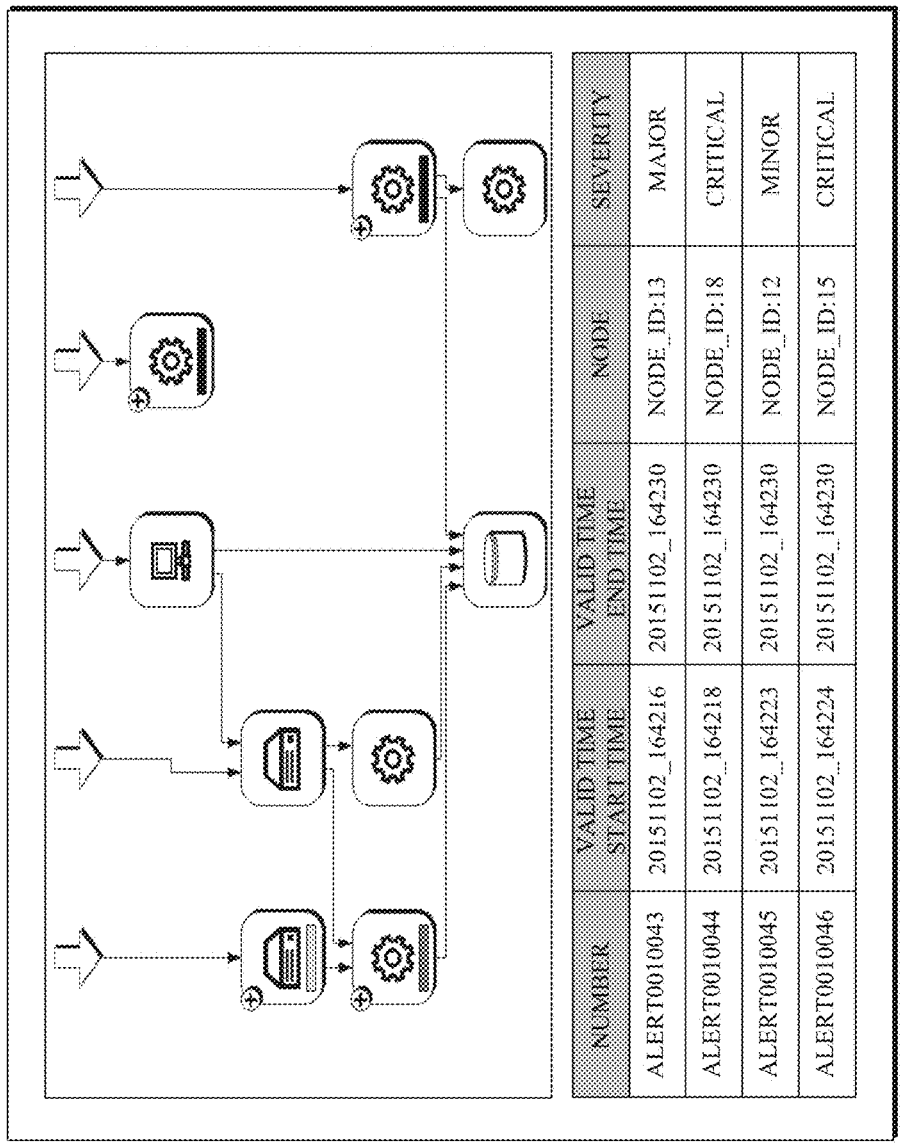
FIG. 13 is an illustration of an implementation of a graphical display region including alert data and impact data.

FIG. 13 is an illustration 1300 of an implementation of a graphical display region including alert data and impact data. In an implementation, the graphical display region can include a graphical representation of a node hierarchy, which can comprise colored indicators representative of a severity indicated by the impact data. For example, a graphical representation of the node hierarchy may be updated after impact calculation is performed in order to reflect the calculated impact values for applicable nodes based on valid alerts. In an implementation, the graphical display region can include a graphical representation of the data structure (shown below the graphical representation of the node hierarchy in illustration 1300), which can include impact data and/or alert data. In an implementation, the graphical representation of the data structure may comprise a table combining values of alert table 1100 of FIG. 11 and impact table 1200 of FIG. 12. For example, and as shown in the figure, the graphical representation of the data structure may display data indicative of an identifier of an alert, a valid time start time of the alert, a valid time end time of the alert, a node or nodes to which the alert applies, and a severity calculated for the node based on the valid alert. In an implementation, the graphical representation of the data structure may include complete or partial versions of alert table 1100 and/or impact table 1200.

In an implementation, additional tables, graphs, or other illustrations for facilitating the processing and/or display of alert data and/or impact data may be included in a graphical display region, for example, an impact rule table indicative of impact rules used for generating the node hierarchy, an impact tree (e.g., tree 1000 of FIG. 10), and/or other representations of alert data and/or impact data.

Further implementations of the disclosure will now be described with reference to FIGS. 14 and 15. The steps, or operations, of any method, process, or algorithm described in connection with the embodiments disclosed herein may be embodied directly in hardware, firmware, software executed by hardware, circuitry, or a combination of these. Broadly, methods 1400 and 1500 of FIGS. 14 and 15, respectively, are used to perform certain monitoring and analysis in computing network 100. In an implementation, methods 1400 and/or 1500 may be executed using machines and hardware such as the equipment of FIGS. 1 through 4. In an implementation, methods 1400 and/or 1500 may be performed by components of system server 500. One or both of methods 1400 or 1500 may be performed, for example, by executing a machine-readable program of Javascript, C, or other such instructions. Implementations of the present disclosure may include multiple of the above-described features.

For ease of explanation, methods 1400 and 1500 are depicted and described as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

Figures 14, 15:
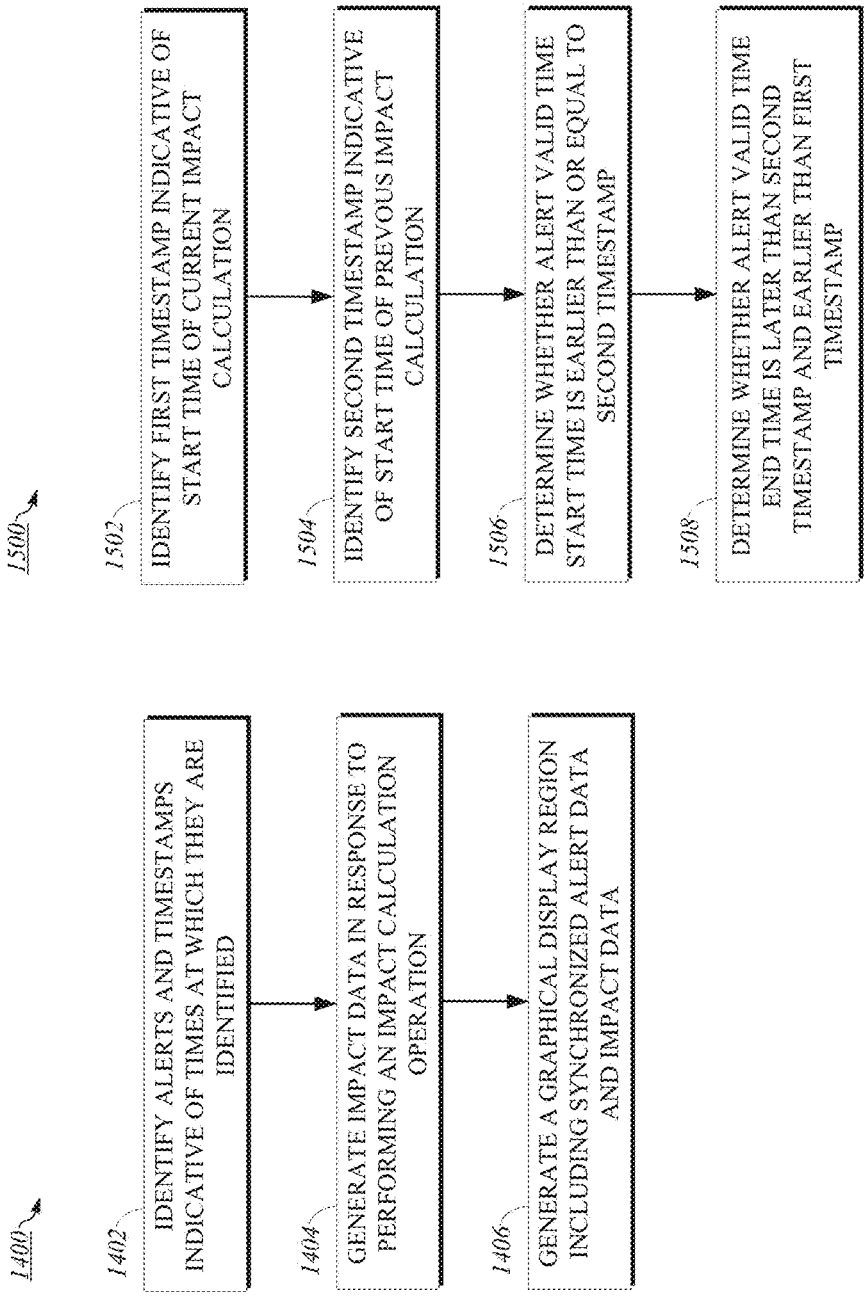
FIG. 14 is a flowchart showing an implementation of a method for generating a graphical display region including synchronized alert data and impact data indicative of conditions of the computing network.
FIG. 15 is a flowchart showing an implementation of a method for determining the validity of identified alerts.

FIG. 14 is a flowchart showing an implementation of a method 1400 for generating a graphical display region including synchronized alert data and impact data indicative. Method 1400 begins at operation 1402, where alerts can be identified. Implementations for identifying alerts are discussed above with respect to FIG. 7. In an implementation, data indicative of the alerts can be stored in the data structure upon identification. In that alerts can be continuously identified, the alert data can be continuously stored. In an implementation, for example, where the data structure comprises a single table or other structure for storing data, the alert data can be stored within the single table or other structure. In an implementation, for example, where the data structure comprises more than one table or structure for storing data (e.g., an alert table, such as alert table 1100 of FIG. 11, and an impact table, such as impact table 1200 of FIG. 12), the alert data can be stored in the alert table. For example, the alert data may be stored in the alert table based on a corresponding valid alert start time and valid alert end time. In an implementation where an earlier version of the alert data is already stored in the data structure (e.g., where a previous alert similar or identical to a newly identified alert has already been identified and stored), storing the alert data can comprise one of replacing the earlier version with the newly identified alert data, retaining the earlier version in the data structure and storing the newly identified alert data, or retaining the earlier version in the data structure and discarding the newly identified alert data, for example, by not storing it in the data structure. In an implementation, storing the alert data in the data structure includes storing valid time data for the alert data, such as a valid time start time and a valid time end time for the alert data.

At operation 1404, impact data can be generated in response to performing an impact calculation operation. Implementations for performing impact calculation are discussed above with reference to FIG. 7. However, in an implementation, performing an impact calculation operation includes the system management module identifying nodes of the node hierarchy having a severity vector that changed in response to one or more identified alerts. That is, impairment by an identified alert can be reflected by affected nodes having a changed severity vector, which may be indicated using a flag, such as a bit for distinguishing between changed and unchanged values. In an implementation, and as discussed above with respect to FIGS. 7 and 9, the flag may be graphically represented as part of the node hierarchy (e.g., as part of a graphical display region to be generated) to depict the status of applicable nodes as being flagged for impact calculation. In an implementation, a common data structure may be used to track the nodes of the node hierarchy that are flagged at any given time. As a result of performing the impact calculation operation, the severity for nodes affected by the identified alerts can be determined based on a severity vector for each affected node. In an implementation, the severity vector comprises a self-severity vector representative of a degree to which the identified alert affects the severity of the node independent of the effect on any other nodes. In an implementation, the severity vector comprises a contribution vector representative of a degree to which a severity of nodes from which a given node depends affects the severity of the given node. In an implementation, the severity vector can comprise a self-severity vector and a contribution vector.

In an implementation, the selection of alerts available or usable for performing an impact calculation operation can be restricted, for example, based on a time at which the alerts were identified or a valid time for the alerts, to the extent different. For example, the impact calculation operation can be performed using only alerts that have been identified and stored in the data structure before or at the time that the impact calculation operation begins. In an implementation, alerts valid for the impact calculation can be those valid as of a time proximate to the start time of the impact calculation operation. For example, alerts can be valid for the impact calculation operation where they are identified before the start time of the impact calculation operation. As another example, alerts can be valid for the impact calculation operation where they are identified before a time proximate to the impact calculation operation start time (e.g., five or ten seconds before the start time). In an implementation, a time is proximate to a start time of an impact calculation operation if it is the same as or earlier than the start time of the impact calculation operation and related to the impact calculation operation (e.g., as opposed to an earlier impact calculation operation). In this way, the valid time data for the impact data generated in response to performing the impact calculation operation can correspond to the valid time data for the alerts used to perform the impact calculation operation.

In an implementation, for example, where the data structure comprises a single table or other structure for storing data, the impact data can be stored within the single table or other structure. In an implementation where the data structure comprises more than one table or structure for storing data (e.g., an alert table, such as alert table 1100 of FIG. 11, and an impact table, such as impact table 1200 of FIG. 12), the impact data may be stored in the impact table. For example, the impact data may be stored in the impact table based on a start time of a current impact calculation operation. In an implementation where an earlier version of the impact data is already stored in the data structure (e.g., where a previously performed impact calculation operation generated impact data similar or identical to the newly identified impact data, for example, based on the same alerts), storing the impact data can comprise one of replacing the earlier version with the newly identified impact data, retaining the earlier version in the data structure and storing the newly identified impact data, or retaining the earlier version in the data structure and discarding the newly identified impact data, for example, by not storing it in the data structure. In an implementation, storing the impact data in the data structure includes storing valid time data for the impact data, such as a valid time start time and a valid time end time for the impact data.

At operation 1406, a graphical display region can be generated. In an implementation, the graphical display region includes synchronized alert data and impact data. For example, the included impact data can be impact data valid as of a display time (e.g., a time at which the generation of the graphical display region begins or completes) and alert data indicative of alerts valid as of an impact calculation start time. In an implementation, alert data comprises data indicative of alerts identified, for example, by a system management module.

In an implementation, for example, where the alert data and impact data are stored in the data structure, generating the graphical display region can comprise querying the data structure for the alert data and the impact data. The data structure can be queried for valid alert data, for example, based on a time that is proximate to a start time of an impact calculation performed with respect to the node hierarchy (e.g., at or before the impact calculation operation start time, or at or before a time prior and proximate to the start time). In an implementation, the impact calculation start time (or time proximate thereto) can be represented as a timestamp or other temporal value identified as being indicative of a start time of a current impact calculation operation (or time proximate thereto, as applicable). In an implementation, the impact calculation start time or time proximate thereto can be identified, for example, by determining a timestamp or other temporal value relative to some other temporal occurrence (e.g., a signal being received indicative of the commencement of the impact calculation performance), selecting a timestamp or other temporal value most closely or accurately representing the time at which the impact calculation performance started (e.g., based on time intervals), calculating a timestamp or other temporal value based on earlier or later temporal values (e.g., using a previous timestamp indicative of a start time of a previous impact calculation and a value representative of a total amount of time spent performing the impact calculation), or any other manner for identifying the impact calculation start time.

In an implementation, querying the data structure for valid alert data can be done by querying for or requesting stored alert data having a valid time based on the impact calculation start time from the data structure, identifying valid alerts based on the impact calculation start time, identifying alerts based on another timestamp or temporal value and undergoing a comparison to determine validity as of the impact calculation start time, determining alerts from a list based on validity as of the impact calculation start time (e.g., by comparing time values for the alerts with the impact calculation start time), selecting alerts from a list comprising alerts that are all valid as of the impact calculation start time, calculating the validity of alerts selected or determined from a list based on one or more timestamps or other time representations, or any other manner for identifying alerts valid as of the impact calculation start time. Implementations for determining alerts valid as of the impact calculation start time are described below with respect to FIG. 15.

The data structure can also be queried for valid impact data. In an implementation, the valid impact data comprises data stored in the data structure indicative of severities for nodes of the node hierarchy calculated in response to performing an impact calculation operation, for example, at the impact calculation start time discussed above. As such, the valid impact data can be based on a display time, the impact calculation start time, the valid alert data queried, or a timestamp indicative of indicative of a following impact calculation operation. In an implementation, querying the data structure for valid impact data can be done by querying for or requesting stored impact data having a valid time based on the impact calculation start time from the data structure, identifying valid impact data based on valid alert data used for performing the corresponding impact calculation operation, identifying impact data based on another timestamp or temporal value and undergoing a comparison to determine validity as of the impact calculation start time, determining impact data from a list based on validity as of the first timestamp (e.g., by comparing time values for the impact data with the impact calculation start time), selecting impact data from a list comprising impact data that are all valid as of the impact calculation start time, calculating the validity of impact data selected or determined from a list based on one or more timestamps or other time representations, or any other manner for identifying impact data valid as of the impact calculation start time.

In an implementation, the graphical display region can be generated based on the queried alert data and impact data. In an implementation, the graphical display region can include graphical representations of the node hierarchy and data structure, for example, based on the queried alert data and impact data. The graphical representation of the node hierarchy may comprise, for example, a graphical representation of the node hierarchy and/or an impact tree (e.g., impact tree 1000 of FIG. 10). The graphical representation of the data structure may comprise, for example, a graphical representation of an alert table (e.g., alert table 1100 of FIG. 11), an impact table (e.g., impact table 1200 of FIG. 12), and/or a single table representative of the data stored in the alert table and impact table. In an implementation, the graphical display region can be displayed at one or more hardware devices, such as one or more of customers 210, 220 or clients 212, 214, 222, 224. In an implementation, the graphical display region can be displayed as part of a software graphical user interface displayed on the one or more hardware devices.

In an implementation, the graphical display region can be updated, for example, by replacing previous versions of the data included in the graphical display region with the corresponding updated versions generated based on the queried impact data and alert data, iterating through previous versions of the graphical display region to determine portions of the graphical display region to be updated based on the queried impact data and alert data, or any other manner for preparing the queried impact data and alert data to be displayed as part of the graphical display region.

Other operations beyond those shown in FIG. 14 can be included in method 1400. For example, in an implementation, method 1400 can further comprise an operation for removing data stored in the data structure, for example, where the data is determined to no longer be valid. In an implementation, alert data can be removed from the data structure where it is determined to no longer be valid, for example, because the underlying alert was processed during a previous impact calculation operation, the underlying alert is not applicable to a current impact calculation operation performed as of a new impact calculation start time, etc. In an implementation, impact data can be removed from the data structure where it is determined to no longer be valid, for example, because it is indicative of data generated in response to a previously performed impact calculation or was otherwise generated based on alerts other than those indicated by the valid alert data. In an implementation, alert data and impact can also be removed from the data structure for other reasons, for example, due to memory constraints, such as where space needs to be made for new alert data and impact data. In an implementation, the alert data and/or impact data can automatically be culled from the data structure upon a current time reaching a valid time end time for the data.

FIG. 15 is a flowchart showing an implementation of a method for determining the validity of identified alerts. In an implementation, method 1500 can represent sub-operations for performing all or a portion of an implementation of operation 1404 of method 1400. At operation 1502, a first timestamp indicative of a start time of a current impact calculation being performed can be identified. In an implementation, identifying the first timestamp comprises one of receiving a start time of the current impact calculation from a system clock or other software application, identifying the start time based on detecting that performance of the current impact calculation has begun, determining the start time of the current impact calculation based on other time values, for example, the start time of a previous impact calculation and a duration of the previous impact calculation, selecting the start time of the current impact calculation from a list of time intervals for performing impact calculation, for example, based on a start time of a previous impact calculation, etc. Implementations of the present disclosure may include combinations of the foregoing, for example, where a first implementation is used to identify the first timestamp and one or more other implementations are used to validate the first timestamp.

At operation 1504, a second timestamp indicative of a start time of a previous impact calculation can be identified. The second timestamp can be identified in similar implementations as discussed above at operation 1502 for identifying the first timestamp. In an implementation, the second timestamp is based on historical data indicative of an earlier operation for performing impact calculation.

At operation 1506, the valid time start time of an identified alert can be compared to the second timestamp as an initial determination of alert validity. In an implementation, the comparison of operation 1506 comprises determining whether the valid time start time of the identified alert is earlier than or equal to the second timestamp identified at operation 1504. Alerts having valid time start times that are not earlier than or equal to the second timestamp can be identified as invalid with respect to the current impact calculation. Alerts identified as invalid at operation 1506 may not be further processed by method 1500.

At operation 1508, the valid time end time of an identified alert not identified as invalid at operation 1506 can be compared to the first timestamp and/or the second timestamp as a further determination of alert validity. In an implementation, the comparison of operation 1508 comprises determining whether the valid time end time of the identified alert is later than the second timestamp identified at operation 1504 and earlier than the first timestamp identified at operation 1502. In the event that the valid time end time of the identified alert is either not later than the second timestamp or not earlier than the first timestamp, the identified alert can be identified as invalid with respect to the current impact calculation. However, alerts not identified as invalid at operations 1506 and 1508 can be identified as valid with respect to the current impact calculation. Identifying alert validity is done to ensure that the alert data to be displayed, for example, within the alert table, corresponds to the impact data to be displayed, for example, within the node hierarchy, such that associated alert data and impact data can be displayed.

Implementations other than those discussed above with respect to FIG. 15 can be used for determining the validity of identified alerts. For example, in an implementation, an alert can be determined to be valid with respect to a current impact calculation operation wherein it was identified at or prior to the first timestamp. In this way, any alerts that have been identified by the time that the current impact calculation operation begins can be determined to be valid, whereas alerts that have not been identified by that time may not be determined valid. In an implementation, where an alert was valid with respect to a previous impact calculation operation, it can remain valid for a current impact calculation operation, for example, where the impairments indicated by the alert remain in effect with respect to any nodes of the node hierarchy as of the start time of the current impact calculation.

While the foregoing disclosure shows a number of illustrative implementations, it will be apparent to those skilled in the art that various changes and modifications can be made herein without departing from the scope of the disclosure as defined by the appended claims. Accordingly, the disclosed implementations are representative of the subject matter which is broadly contemplated by the present disclosure, and the scope of the present disclosure fully encompasses other implementations which may become obvious to those skilled in the art, and that the scope of the present disclosure is accordingly to be limited by nothing other than the appended claims.

All structural and functional equivalents to the elements of the above-described implementations that are known or later come to be known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Furthermore, although elements of the disclosure may be described or claimed in the singular, reference to an element in the singular is not intended to mean "one and only one" unless explicitly so stated, but shall mean "one or more." Additionally, ordinarily skilled artisans will recognize in view of the present disclosure that while operational sequences must be set forth in some specific order for the purpose of explanation and claiming, the present disclosure contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present disclosure. Further, any routines, platforms, or other functionality as disclosed herein associated with or implemented as software may be performed by software modules comprising instructions executable by a process for performing the respective routine, platform, or other functionality.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

It is to be understood that the present disclosure is not to be limited to the disclosed implementations but, on the contrary, is intended to cover various modifications and equivalent arrangements included within the scope of the appended claims.

What is claimed is:

1. A system for generating a graphical display region indicative of a condition of a computing infrastructure, the system comprising:
 a server comprising a processor and a memory, wherein the memory includes code executable by the processor to execute:
  a configuration management database comprising nodes representative of at least one of an infrastructure resource or an applicative resource in the computing infrastructure;
  a data structure configured to store states of validity for nodes of the configuration management database; and
  a system management module configured to generate the graphical display region by executing instructions to:
   identify alerts relating to one or more of the nodes, each alert having a timestamp indicative of a first time at which it was identified;
   perform an impact calculation to generate impact data for each alert that is related to a valid node, wherein the impact calculation determines an impact of the alert on the computing infrastructure; and
   generate the graphical display region to display the impact data and alert data indicative of the alerts for each valid node.

2. The system of claim 1, wherein each alert related to its respective valid node is valid as of an impact calculation start time when the timestamp of the alert is earlier than or coincident with the impact calculation start time.

3. The system of claim 2, wherein a previous impact calculation is performed at a previous impact calculation start time, wherein the previous impact calculation start time is earlier than the impact calculation start time, and wherein the alert related to its respective valid node is valid as of the impact calculation start time if the timestamp of the alert is between the previous impact calculation start time and the impact calculation start time.

4. The system of claim 1, wherein impact data is valid as of a display time when an impact calculation start time is earlier than the display time and no other impact data has been generated since the impact calculation start time.

5. The system of claim 1, wherein the data structure comprises an alert table of the alert data and an impact table of the impact data, and wherein the alert data and the impact data are displayed in the graphical display region in an alert and impact table and in a graphical representation of a node hierarchy.

6. The system of claim 5, wherein the system management module is further configured to:
 store an identified alert in the data structure by executing instructions to:
  store the alert data indicative of the identified alert in the alert table based on a valid start time and a valid end time of the alert.

7. The system of claim 5, wherein the system management module is further configured to:
 store the impact data in the data structure by executing instructions to:
  store the impact data in the impact table based on a valid start time and a valid end time of the impact data.

8. The system of claim 1, wherein the system management module is further configured to:
 remove, from the data structure, data indicative of the identified alerts that are not valid as of an impact calculation start time.

9. The system of claim 1, wherein the system management module is further configured to:
 remove, from the data structure, the impact data that is not valid as of a display time.

10. A method for generating a graphical display region indicative of a condition of a computing infrastructure comprising a server comprising a processor and a memory, wherein the memory includes code executable by the processor to execute a configuration management database comprising nodes representative of at least one of an infrastructure resource or an applicative resource in the computing infrastructure and a data structure configured to store states of validity for nodes of the configuration management database, the method comprising:
 identifying alerts relating to one or more of the nodes, each alert having a timestamp indicative of a first time at which it was identified;
 performing an impact calculation to generate impact data for each alert that is related to a valid node, wherein the impact calculation determines an impact of the alert on the computing infrastructure; and
 generating the graphical display region to display the impact data and alert data indicative of the alerts for each valid node.

11. The method of claim 10, wherein each alert related to its respective valid node is valid as of an impact calculation start time when the timestamp of the alert is earlier than or coincident with the impact calculation start time.

12. The method of claim 11, wherein a previous impact calculation is performed at a previous impact calculation start time, wherein the previous impact calculation start time is earlier than the impact calculation start time, and wherein the alert related to its respective valid node is valid as of the impact calculation start time if the timestamp of the alert is between the previous impact calculation start time and the impact calculation start time.

13. The method of claim 10, wherein impact data is valid as of a display time when an impact calculation start time is earlier than the display time and no other impact data has been generated since the impact calculation start time.

14. The method of claim 10, wherein the data structure comprises an alert table of the alert data and an impact table of the impact data, and wherein the alert data and the impact data are displayed in the graphical display region in an alert and impact table and in a graphical representation of a node hierarchy.

15. The method of claim 14, comprising:
 storing an identified alert in the data structure by:
  storing the alert data indicative of the identified alert in the alert table based on a valid start time and a valid end time of the alert.

16. The method of claim 14, comprising:
 storing impact data in the data structure by:

storing the impact data in the impact table based on a valid start time and a valid end time of the impact data.

17. The method of claim 10, comprising:

removing, from the data structure, data indicative of the identified alerts that are not valid as of an impact calculation start time.

18. The method of claim 10, comprising:

removing, from the data structure, the impact data that is not valid as of a display time.

19. A system, comprising:

a memory; and a processor configured to execute instructions stored in the memory to:

identify alerts relating to one or more nodes, each alert having a timestamp indicative of a first time at which it was identified;

perform an impact calculation to generate impact data for each alert that is related to a valid node, wherein the impact calculation determines an impact of the alert on a computing infrastructure; and generate a graphical display region to display the impact data and alert data indicative of the alerts for each valid node.

20. The system of claim 19, wherein a previous impact calculation is performed at a previous impact calculation start time, wherein the previous impact calculation start time is earlier than an impact calculation start time, and wherein the alert related to its respective valid node is valid as of the impact calculation start time if the timestamp of the alert is between the previous impact calculation start time and the impact calculation start time, and wherein impact data is valid as of a display time if the impact calculation start time is earlier than the display time and no other impact data has been generated since the impact calculation start time.

\* \* \* \* \*